US009602552B2

(12) United States Patent
Bakker et al.

(10) Patent No.: US 9,602,552 B2
(45) Date of Patent: Mar. 21, 2017

(54) CODING AND BEHAVIOR WHEN RECEIVING AN IMS EMERGENCY SESSION INDICATOR FROM AUTHORIZED SOURCE

(75) Inventors: Jan Hendrik Lucas Bakker, Keller, TX (US); Adrian Buckley, Tracy, CA (US); Andrew Allen, Mundelein, IL (US)

(73) Assignee: BlackBerry Limited, Waterloo, Ontario (CA)

( * ) Notice: Subject to any disclaimer, the term of this patent is extended or adjusted under 35 U.S.C. 154(b) by 1204 days.

(21) Appl. No.: 12/131,779

(22) Filed: Jun. 2, 2008

(65) Prior Publication Data

US 2009/0296688 A1 Dec. 3, 2009

(51) Int. Cl.

| H04L 12/66 | (2006.01) |
|---|---|
| H04L 29/06 | (2006.01) |
| H04M 1/725 | (2006.01) |
| H04M 3/42 | (2006.01) |
| H04W 4/22 | (2009.01) |
| H04W 76/00 | (2009.01) |
| H04M 3/436 | (2006.01) |
| H04M 7/00 | (2006.01) |

(52) U.S. Cl.
CPC ...... *H04L 65/1016* (2013.01); *H04L 65/1006* (2013.01); *H04L 65/1059* (2013.01); *H04L 65/1069* (2013.01); *H04M 1/72536* (2013.01); *H04M 3/42382* (2013.01); *H04W 4/22* (2013.01); *H04W 76/007* (2013.01); *H04M 3/436* (2013.01); *H04M 7/006* (2013.01); *H04M 2207/18* (2013.01); *H04M 2242/04* (2013.01)

(58) Field of Classification Search
CPC ......... H04W 80/10; H04W 4/02; H04W 4/22; H04W 76/007; H04W 76/021; H04W 76/022; H04W 8/26; H04L 12/66; H04L 65/1006; H04L 65/1016; H04L 65/1069; H04L 67/18; H04L 69/329
USPC ........................................ 455/404.1; 370/352
See application file for complete search history.

(56) References Cited

U.S. PATENT DOCUMENTS

| 6,091,362 A | 7/2000 | Stilp et al. |
|---|---|---|
| 6,198,914 B1 | 3/2001 | Saegusa |
| 6,687,504 B1 | 2/2004 | Raith |

(Continued)

FOREIGN PATENT DOCUMENTS

| CN | 1222807 A | 7/1999 |
|---|---|---|
| CN | 101132623 A | 2/2008 |

(Continued)

OTHER PUBLICATIONS

Schulzrinne, A Uniform Resource Name (URN) for Emergency and other Well-Known Services, Jan. 2008, RFC 5031, pp. 1-15.*

(Continued)

*Primary Examiner* — Khaled Kassim
*Assistant Examiner* — Zhaohui Yang
(74) *Attorney, Agent, or Firm* — Fish & Richardson P.C.

(57) ABSTRACT

A method is provided for a user equipment (UE) to respond to an emergency-related message sent to the UE. The method comprises the UE receiving a first message containing an indicator indicating that an emergency-related request has been made, the UE recognizing the indicator as an indication that the emergency-related request is related to an emergency, and the UE sending a second message containing emergency-related information about itself.

16 Claims, 6 Drawing Sheets

(56) References Cited

U.S. PATENT DOCUMENTS

| | | | |
|---|---|---|---|
| 6,738,808 | B1 | 5/2004 | Zellner et al. |
| 6,766,159 | B2* | 7/2004 | Lindholm ................. 455/404.1 |
| 7,050,785 | B2 | 5/2006 | Islam et al. |
| 7,116,967 | B2 | 10/2006 | Kauppinen et al. |
| 7,245,900 | B1 | 7/2007 | Lamb et al. |
| 7,336,962 | B2 | 2/2008 | Levitan |
| 7,702,081 | B1 | 4/2010 | Klesper et al. |
| 7,738,855 | B2 | 6/2010 | Jang et al. |
| 8,040,862 | B1* | 10/2011 | Rosenberg et al. ........... 370/338 |
| 8,200,185 | B2* | 6/2012 | Edge et al. ................ 455/404.1 |
| 8,305,210 | B2 | 11/2012 | Bakker et al. |
| 8,369,824 | B2 | 2/2013 | Bakker et al. |
| 8,442,479 | B2 | 5/2013 | Bakker et al. |
| 8,478,226 | B2 | 7/2013 | Bakker et al. |
| 8,755,765 | B2 | 6/2014 | Bakker et al. |
| 2005/0003797 | A1 | 1/2005 | Baldwin |
| 2005/0233727 | A1* | 10/2005 | Poikselka et al. ......... 455/404.2 |
| 2006/0018272 | A1 | 1/2006 | Mutikainen et al. |
| 2007/0060097 | A1 | 3/2007 | Edge et al. |
| 2007/0117539 | A1 | 5/2007 | Harris |
| 2007/0117577 | A1 | 5/2007 | Harris |
| 2007/0143423 | A1 | 6/2007 | Kieselbach et al. |
| 2007/0149166 | A1* | 6/2007 | Turcotte et al. ........... 455/404.1 |
| 2007/0254625 | A1* | 11/2007 | Edge ......................... 455/404.1 |
| 2007/0260739 | A1 | 11/2007 | Buckley et al. |
| 2007/0274289 | A1* | 11/2007 | Buckley et al. ........ H04L 12/66 370/351 |
| 2008/0008157 | A1 | 1/2008 | Edge et al. |
| 2008/0063153 | A1* | 3/2008 | Krivorot et al. ................ 379/45 |
| 2008/0267171 | A1* | 10/2008 | Buckley et al. ............. 370/352 |
| 2008/0310599 | A1 | 12/2008 | Purnadi et al. |
| 2009/0047922 | A1* | 2/2009 | Buckley et al. ........... 455/404.1 |
| 2009/0296689 | A1 | 12/2009 | Bakker et al. |
| 2009/0298458 | A1 | 12/2009 | Bakker et al. |
| 2011/0099281 | A1 | 4/2011 | Bakker et al. |
| 2011/0119340 | A1* | 5/2011 | Van Elburg et al. ......... 709/206 |

FOREIGN PATENT DOCUMENTS

| | | | |
|---|---|---|---|
| EP | 1906638 A1 | | 4/2008 |
| JP | 2007-172625 A | | 7/2007 |
| JP | 2009-535944 A | | 10/2009 |
| WO | 03/009627 A1 | | 1/2003 |
| WO | 03094563 | | 11/2003 |
| WO | 2007016695 A2 | | 2/2007 |
| WO | 2007/016695 A2 | | 8/2007 |
| WO | 2007/127991 A2 | | 11/2007 |
| WO | 2008022554 | | 2/2008 |
| WO | WO 2008022554 A1 * | | 2/2008 |

OTHER PUBLICATIONS

3GPP, ETSI TS 124 008, Apr. 2008, version 7.11.0, pp. 1-551.*
RFC 3261, p. 184, Jun. 2002.*
3GPP TS 24.229 V7.11.0; 3rd Generation Partnership Project; Technical Specification Group Core Network and Terminals; IP Multimedia Call Control Protocol Based on Session Initiation Protocol (SIP) and Session Description Protocol (SDP); Stage 3, Release 7; Section 5.1.2A; Mar. 2008; pp. 1-15 and 49-53.
Bakker, John-Luc, et al.; U.S. Appl. No. 12/131,785, filed Jun. 2, 2008; Title: "Updating a Request Related to an IMS Emergency Session".
Bakker, John-Luc, et al.; U.S. Appl. No. 12/131,790, filed Jun. 2, 2008; Title: "Privacy-Related Requests for an IMS Emergency Session".
PCT International Search Report; PCT Application No. PCT/US2009/045987; Sep. 7, 2009; 3 pgs.
PCT Written Opinion of the International Searching Authority; PCT Application No. PCT/US2009/045987; Sep. 7, 2009; 6 pgs.
PCT International Search Report; PCT Application No. PCT/US2009/045990; Sep. 7, 2009; 3 pgs.
PCT Written Opinion of the International Searching Authority; PCT Application No. PCT/US2009/045990; Sep. 7, 2009; 6 pgs.
PCT International Search Report; PCT Application No. PCT/US2009/045992; Sep. 15, 2009; 3 pgs.
PCT Written Opinion of the International Searching Authority; PCT Application No. PCT/US2009/045992; Sep. 15, 2009; 7 pgs.
ETSI TS 124 229 v8.3.0; Digital Cellular Telecommunications System (Phase 2+): Universal Mobile Telecommunications System (UMTS); Internet Protocol (IP) Multimedia Call Control Protocol Based on Session Initiation Protocol (SIP) and Session Description Protocol (SDP); Stage 3; (3GPP TS 24.229 version 8.3.0 Release 8); Apr. 2008; pp. 1-125. Part 1.
ETSI TS 124 229 v8.3.0; Digital Cellular Telecommunications System (Phase 2+): Universal Mobile Telecommunications System (UMTS); Internet Protocol (IP) Multimedia Call Control Protocol Based on Session Initiation Protocol (SIP) and Session Description Protocol (SDP); Stage 3; (3GPP TS 24.229 version 8.3.0 Release 8); Apr. 2008; pp. 126-250. Part 2.
ETSI TS 124 229 v8.3.0; Digital Cellular Telecommunications System (Phase 2+): Universal Mobile Telecommunications System (UMTS); Internet Protocol (IP) Multimedia Call Control Protocol Based on Session Initiation Protocol (SIP) and Session Description Protocol (SDP); Stage 3; (3GPP TS 24.229 version 8.3.0 Release 8); Apr. 2008; pp. 251-375 Part 3.
ETSI TS 124 229 v8.3.0; Digital Cellular Telecommunications System (Phase 2+): Universal Mobile Telecommunications System (UMTS); Internet Protocol (IP) Multimedia Call Control Protocol Based on Session Initiation Protocol (SIP) and Session Description Protocol (SDP); Stage 3; (3GPP TS 24.229 version 8.3.0 Release 8); Apr. 2008; pp. 376-497 Part 4.
Bakker, Jan Hendrik Lucas, et al.; U.S. Appl. No. 12/935,826; Title: Coding and Behavior When Receiving an IMS Emergency Session Indicator From Authorized Source; Filing Date: Sep. 30, 2010.
3GPP TS 24.229 v7.11.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 7; Mar. 2008; 434 pages.
3GPP TS 24.229 v8.3.0; 3rd Generation Partnership Project; Technical Specification Group Core Network and Terminals; IP Multimedia Call Control Protocol Based on Session Initiation Protocol (SIP) and Session Description Protocol (SDP); Stage 3; Release 8; Mar. 2008; 495 pages.
3GPP TS 24.403 v1.8.1; 3rd Generation Partnership Project; Techincal Specification Group Core Network and Terminals; Telecommunications and Internet Converged Services and Protcols for Advanced Networking (TISPAN); IP Multimedia Call Control Protocol based on Session Initiation Protocol (SIP) and Session Description Protocol (SDP); Stage 3; Release 7; Dec. 2007; 96 pages.
3GPP TSG CT WG1 Meeting #49; "Corrections for Emergency Procedures"; C1-072991; Nokia Siemens Networks, Nokia, Ericsson; Kobe, Japan; Oct. 8-12, 2007; 8 pgs.
Office Action dated Apr. 4, 2011; U.S. Appl. No. 12/131,785, filed Jun. 2, 2008; 15 pages.
PCT International Preliminary Report on Patentability; PCT Application No. PCT/US2009/045987; Dec. 6, 2010; 7 pgs.
European Examination Report; EP Application No. 09759254.7; Apr. 5, 2011; 8 pgs.
PCT International Preliminary Report on Patentability; PCT Application No. PCT/US2009/045990; Dec. 6, 2010; 6 pgs.
European Examination Report; EP Application No. 09759255.4; Apr. 8, 2011; 6 pgs.
PCT International Preliminary Report on Patentability; PCT Application No. PCT/US2009/045992; Dec. 6, 2010; 8 pgs.
Translation of Office Action issued in corresponding Korean Patent Application No. 10-2010-7029766 dated Jun. 1, 2012, 9 pgs.
Translation of Office Action issued in corresponding Japanese Patent Application No. 2011-511905 dated Aug. 7, 2012, 3 pgs.
Translation of Office Action issued in corresponding Japanese Patent Application No. 2011-511904 dated Aug. 7, 2012, 5 pgs.
Translation of Office Action issued in corresponding Korean Patent Application No. 10-2010-7029767 dated May 30, 2012, 8 pgs.
Office Action issued in corresponding Mexican Patent Application No. MX/a/2010/013081 dated Jun. 15, 2012, 6 pgs, no translation.

(56) References Cited

OTHER PUBLICATIONS

Office Action issued in corresponding Canadian Patent Application No. 2,726,628 dated Jul. 5, 2012, 3 pgs.
USPTO Office Action issued in corresponding U.S. Appl. No. 13/244,795 dated Jun. 8, 2012.
Rosen et al., "Best Current Practices for Communications Services in Support of Emergency Calling," Feb. 27, 2006, draft-rosen-sos-phonebcp-00.txt, 15 pgs.
USPTO Office Action issued in corresponding U.S. Appl. No. 12/131,790 dated Jan. 5, 2012.
USPTO Office Action issued in corresponding U.S. Appl. No. 12/994,416 dated Jan. 9, 2012.
USPTO Office Action issued in corresponding U.S. Appl. No. 13/244,795 dated Jan. 9, 2012.
USPTO Office Action issued in corresponding U.S. Appl. No. 12/935,826 dated Feb. 10, 2012.
USPTO Office Action issued in corresponding U.S. Appl. No. 12/937,199 dated Mar. 6, 2012.
Taylor et al., "Security Threats and Requirements for Emergency Call Marking and Mapping," Jan. 2008, RFC 5069, 13 pgs.
"SIP: Session Initiation Protocol", Internet Engineering Task Force (IETF) Network Working Group, Request for Comments: 3261, pp. 1-269, Jun. 2002, [retrieved on Dec. 19, 2012 from: http://tools.ietf.org/html/rfc3261].
"Private Header (P-Header) Extensions to the Session Initiation Protocol (SIP) for the 3rd-Generation Partnership Project (3GPP)", Internet Engineering Task Force (IETF) Network Working Group, Request for Comments: 3455, pp. 1-34, Jan. 2003.
"Presence Information Data Format (PIDF)", Internet Engineering Task Force (IETF) Network Working Group, Request for Comments: 3863, pp. 1-28, Aug. 2004, [retrieved on Dec. 19, 2012 from: http://tools.ietf.org/html/rfc3863].
Office Action issued in corresponding Canadian Patent Application No. 2,726,555, dated Jan. 18, 2013, 9 pages.
Office Action issued in corresponding Canadian Patent Application No. 2,726,627 dated Jan. 16, 2013, 9 pages.
Nokia Siemens Networks et al., "Corrections for Emergency Procedures," 3GPP Draft; C1-072991_24229CR1997R2_EMC1_REL-8 Procedure, 3rd Generation Partnership Project (3GPP), Mobile Competence Centre; 650, Route DES Lcuiloes; F-06921 Sophia-Antipolis Cedex; France, vol. CT WG1, no. Sophia Antipolis, France; Nov. 12, 2007, Nov. 12, 2007, XP050027161, 8 pgs.
European Search Report issued in copending EP Application No. 12172479.3-1244 dated Sep. 11, 2012, 6 pgs.
European Patent Office Search Report issued in copending EP Application No. 13162547.7-1853 / 2615795, dated Jul. 11, 2013, 10 pages.
Nokia Siemens Networks et al., "Corrections for emergency procedures," 3GPP Draft; C1-072991_24229CR1997R2_EMC1_REL-8 Procedure, 3rd Generation Partnership Project (3GPP), vol. CTWG1, Nov. 12, 2007, XP050027161, 7 pages.
Jennings et al., "Private Extensions to the Session Initiation Protocol (SIP) for Asserted Identity within Trusted Networks," RFC 3325, Nov. 1, 2002, XP015009093, ISSN: 0000-0003, 19 pages.
European Patent Office Search Report issued in copending EP Application No. 13162615.2-1853 / 2615797, dated Jul. 15, 2013, 8 pages.
3rd Generation Partnership Project; Technical Specification Group Core Network and Terminals; Telecommunications and Internet converged Services and Protocols for Advanced Networking (TISPAN); IP Multimedia Call Control Protocol based on Session Initiation Protocol (SIP) and Session Description Protocol (SDP), 3GPP Standard, 3GPP TS 24.403, No. V1.8.1, Dec. 1, 2007, pp. 1-96, XP050365362, paragraphs [5.2.6.3], [5.2.7.2], [5.2.10.2].
"All-IP Network Emergency Call Support," 3rd Generation Partnership Project 2 '3GPP2', 3GPP2 X. P0049-0, Version 1.0, Nov. 7, 2007, pp. 1-68, XP06210045, retrieved from the Internet: URL:http://ftp.3gpp2.org/TSGX/Working/2007/TSG-X-2007-11-Osaka/TR45.2-2007-11-Osaka/452-20071108-19 TIA-1111 ballot/ [retrieved on Nov. 7, 2007] paragraphs [7.2.1], [8.1.2], [08.3], [08.6].
European Search Report issued in corresponding EP Application No. 12177729.6-1244, dated Sep. 3, 2012, 9 pgs.
Change Request, 24.229 CR 2321, ver. 8.4.1, C1-082335, 3GPP TSG CT WG1 Meeting #54,-24.229, Zagreb, Croatia, Jun. 23-27, 2008, 20 pgs.
Translation of Chinese Office Action issued in corresponding Chinese Application No. 200980130796.X, dated Apr. 1, 2013.
Translation of Chinese Office Action issued in corresponding Chinese Application No. 200980130834.1, dated Apr. 9, 2013.
Translation of Chinese Office Action issued in corresponding Chinese Application No. 200980130795.5, dated Apr. 2, 2013.
SIP: More Than You Ever Wanted to Know About; Mar. 2007; 242 pages.
RFC 4474 Enhancements for Authenticated Identity Management in the Session Initiation Protocol (SIP); Aug. 2006; 38 pages.
RFC 5012 Requirements for Emergency Context Resolution with Internet Technologies; Jan. 2008; 22 pages.
European Search Report in European Application No. 15156206.3, dated Jun. 16, 2015, 5 pages.
3GPP TSG SA WG2 Architecture—S2 #50; Basic Call Flow of North America IMS Emergency Session Establishment; S2-060406; Jan. 16-20, 2006.
English-language Abstract for Japan Patent Pub. No. JP 2007-172625 A (original date Jul. 5, 2007).
English-language Abstract for Japan Patent Pub. No. JP 2009-535944 A (original date Oct. 1, 2009).
Official Action issued by Japan Patent Office on Sep. 2, 2014 in corresponding Application No. JP 2014-015980 (3 pages).
Second Office Action issued Dec. 9, 2013 by the State Intellectual Property Office of the People's Republic of China in corresponding Application No. CN 200980130796.X (5 pages).
English-language translation of Second Office Action issued Dec. 9, 2013 by the State Intellectual Property Office of the People's Republic of China in related Application No. CN 200980130796.X (3 pages).
Second Office Action issued Aug. 26, 2014, by the State Intellectual Property Office of the People's Republic of China in related Application No. CN 200980130796.X (3 pages).
English-language summary translation of the Second Office Action issued Aug. 26, 2014, by the State Intellectual Property Office of the People's Republic of China in corresponding Application No. CN 200980130796.X (3 pages).
Third Office Action issued Aug. 28, 2014, by the State Intellectual Property Office of the People's Republic of China in corresponding Application No. CN 200980130795.5 (5 pages).
English-language translation of Third Office Action issued Aug. 28, 2014, by the State Intellectual Property Office of the People's Republic of China in corresponding Application No. CN 200980130795.5 (4 pages).
Office Action issued in related Chinese Application No. 200980130796.X on Apr. 11, 2016.
Communication Pursuant to Article 94(3) EPC issued in European Application No. 097859257.0 on Jul. 6, 2016.

* cited by examiner

CODING AND BEHAVIOR WHEN RECEIVING AN IMS EMERGENCY SESSION INDICATOR FROM AUTHORIZED SOURCE

BACKGROUND

The IP (Internet Protocol) Multimedia Subsystem (IMS) is a standardized architecture for providing multimedia services and voice-over-IP calls to both mobile and fixed user equipment (UE). The Session Initiation Protocol (SIP) been standardized and governed primarily by the Internet Engineering Task Force (IETF) as a protocol for setting up and managing IMS-based calls. As used herein, the term "UE" can refer to mobile devices such as mobile telephones, personal digital assistants, handheld or laptop computers, and similar devices that have telecommunications capabilities. Such a UE might consist of a wireless device and its associated Universal Integrated Circuit Card (UICC) that includes a Subscriber Identity Module (SIM) application, a Universal Subscriber Identity Module (USIM) application, or a Removable User Identity Module (R-UIM) application or might consist of the device itself without such a card. The term "UE" may also refer to devices that have similar capabilities but that are not transportable, such as fixed line telephones, desktop computers, or set-top boxes. The term "UE" can also refer to any hardware or software component that can terminate a SIP session.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
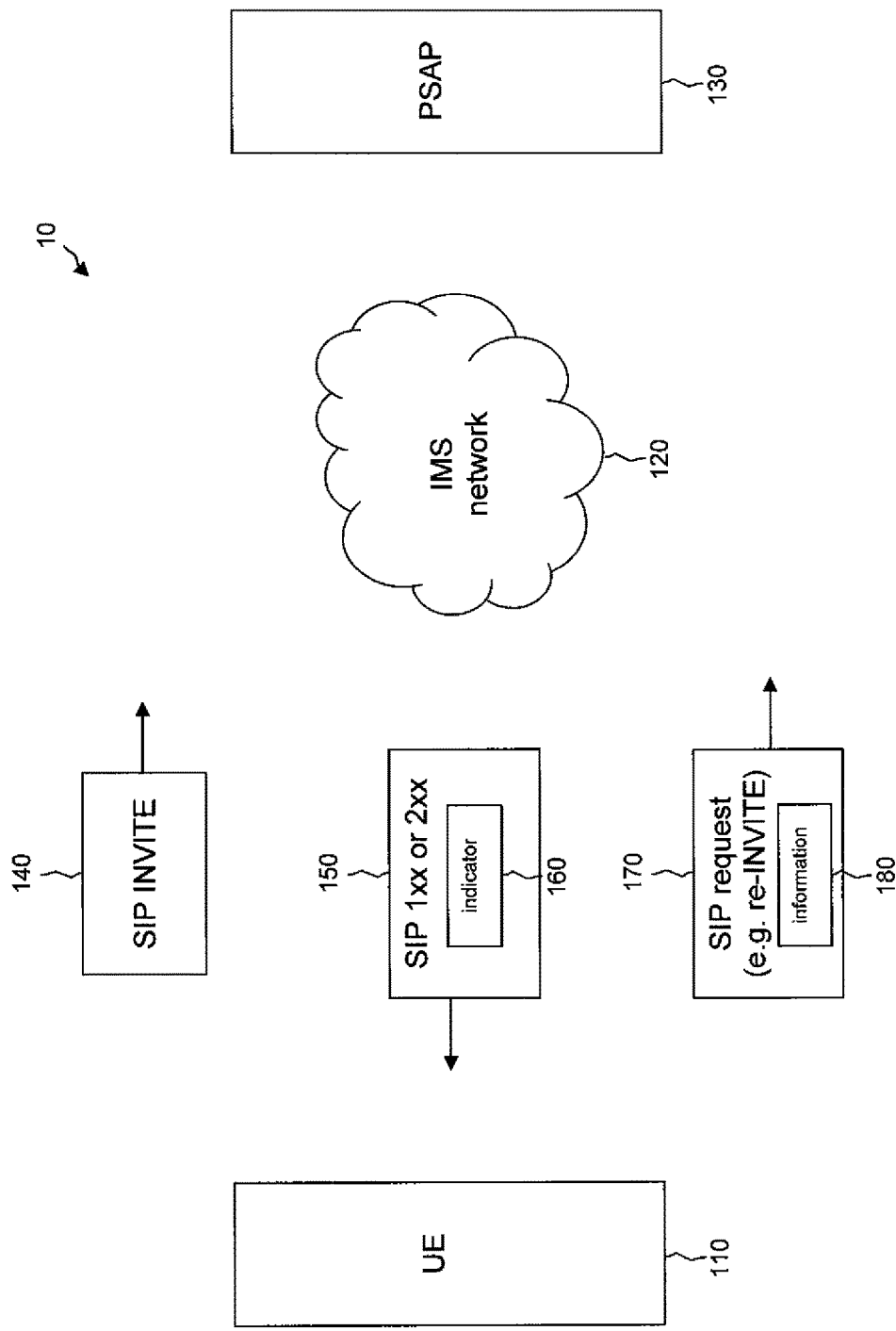
FIG. 1 is a diagram of an illustrative IP network including a UE and a PSAP according to an embodiment of the disclosure.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In an embodiment, a method is provided for a UE to respond to an emergency-related message sent to the UE. The method comprises the UE receiving a first message containing an indicator indicating that an emergency-related call has been placed, the UE recognizing the indicator as an indication that the emergency-related call is related to an emergency, the UE invoking functionality that the emergency-related call is related to the emergency, and/or if the UE is engaged in any other sessions or services these will be suspended, terminated, or kept running but put on a lower priority i.e. QoS changed or dropped as the emergency call or PSAP call back has higher priority, and/or the UE sending a second message containing emergency-related information about itself.

In another embodiment, a UE is provided that includes a processor configured to recognize an IMS call as an emergency-related call originated by a PSAP upon receiving a first message containing an indicator. The processor is further configured to recognize the indicator as an indication that the emergency-related call is related to an emergency, to invoke functionality that the emergency-related call is related to the emergency, and/or if the UE is engaged in any other sessions or services these will be suspended, terminated, or kept running but put on a lower priority i.e. QoS changed or dropped as the emergency call or PSAP call back has higher priority, and/or to send a second message containing emergency-related information about the UE.

In another embodiment, a method is provided for a network component to respond to an emergency-related call from a UE. The method comprises the network component placing in a first message to the UE an indicator indicating that the call was an emergency-related call, and the network component receiving from the UE a second message containing emergency-related information about the UE.

In another embodiment, a network component is provided that includes a processor configured, upon the network component receiving an emergency call from a UE, to place in a first message to the UE an indicator indicating that the call was an emergency call. The processor is further configured to receive a second message from the UE containing emergency-related information about the UE.

A user of a UE, such as an IMS-capable UE, can typically place an emergency call by dialing 911 (in North America), 112 (in most of Europe), 999 (in the United Kingdom), 110, 118, or 119 (in Japan), or some other emergency-specific number. Such a call may be handled by a Public Safety Answering Point (PSAP), which might be an emergency call center or system that can coordinate an appropriate response to the emergency. Any call made to a PSAP will be referred to herein as an emergency call. In this document, a PSAP could also be an emergency centre or emergency centers.

In some cases, a UE might not be aware that a call that it placed was an emergency call. For example, a UE manufactured for use in North America might be programmed to recognize that a call to 911 is an emergency call. If such a UE is taken to a country where a number other than 911 is used for emergency calls, and the UE user dials that other emergency number, the UE might not recognize the call as an emergency call. Undesirable results may occur if the UE does not recognize that a call is an emergency call. For example, the UE could fail to provide relevant information to the PSAP, the UE may treat the call as a regular call and place it on hold or call waiting, the call could be blocked, or the UE might otherwise fail to treat the call appropriately. In addition, the network may not apply special treatment, for example, in a congested network or cell, and the unrecognized emergency call may not be subjected to emergency call procedures (e.g., may not receive priority).

The present disclosure provides for indicating to a UE that a call that the UE placed was an IMS emergency call by including in a message to the UE an indicator that the call was an emergency call. The indicator might be included in a SIP message that may be but is not limited to a SIP 2xx or SIP 1xx message sent to the UE in response to an initial SIP request for a dialog or standalone transaction, or unknown method (e.g., a SIP INVITE request), or a similar message, that the UE sends in attempting to set up the emergency call. Hereinafter, the term "SIP message" may refer to a SIP request (including, e.g., a re-INVITE request or a Target refresh request for a dialog or an initial SIP request for a dialog or standalone transaction, or an unknown method) or a SIP response. It should be noted that the re-INVITE method request can only be sent when conditions documented in the Internet Engineering Task Force (IETF) Request for Comments (RFC) 3261 are satisfied. The SIP message that includes the indicator might be sent by the PSAP or by a component of a network through which the PSAP and the UE communicate with one another. Examples of such components are P-CSCF and E-CSCF.

The emergency-related indicator can be encoded in SIP using the following alternatives: a) SIP bodies such as "application/3gpp-ims+xml" have been used in IMS to indicate additional information or directives to receiving UAs. It can be extended to also indicate to the UE that, upon receipt in an INVITE or similar request, the request is to be taken as an emergency call or PSAP callback and that the functionality associated with calls of such type is to be invoked. This functionality may include but it not limited to alerting the user by visual, audible, or other methods as well as including location information in the response. A new content-disposition header field value may need to be defined. b) A new SIP header could be defined or an existing SIP header could be enhanced. The PSAP itself or the S-CSCF handling the PSAP call back on behalf of the PSAP or another network element such as a signaling gateway can introduce an indicator. c) The indicator could be a new SIP header field. d) The indicator could be a new SIP header field value, e.g., a standardized SIP URN indicating the PSAP function (e.g. mountain rescue or coast guard or general 911) or emergency centre function or emergency personnel function. e) The indicator could be a new URI field. f) The indicator could be a new URI field value, e.g., user=psap, where 'user' is a SIP URI field and 'psap' is a new value that might be put in the Contact header field. g) The standardized SIP URN could be put in the P-Asserted-Identity by the trust domain in which the PSAP or emergency centre or emergency personnel resides. h) The indicator could be contained in the FROM header field value and the FROM header field value can be asserted according to RFC 4474 or REC 3893. This solution is based on certificates.

As identified above, a number of possibilities could be used to indicate that a session is in fact an emergency session. It has been highlighted that the PSAP could be in a visited network such as a VPLMN network and has no trust relationship with the home network such as an HPLMN (Home Public Land Mobile Network). Assuming this is the case when the UE is setting up an emergency session the UE doesn't recognize or when receiving a mobile terminated request containing an indication in the SIP message (e.g., 1xx or 2xx responses or a SIP target refresh request or a similar message) that the request is a PSAP callback, the PSAP or the network could also send back a token that the UE would store. The network could provide this token when the UE registers with IM core network (CN) subsystem. The token could be stored in memory, which could be internal or removable. In the event the UE's emergency call is disconnected or the UE needs to be informed it is requesting an emergency session, the network or PSAP could include this token. Upon receipt of the token from the network, the UE can compare it to the shared token. If the tokens do not match, the UE knows the call is not emergency related.

The SIP "priority" header field set to "emergency" has so far not been used as a trusted indicator for emergency call [RFC 3261]. The installed base of SIP UAs will have different and diverging treatment for this header, if any treatment.

In the event the PSAP callback or emergency call signaling response is received over a Circuit Switched network, the solution can allow for mapping between appropriate Calling-Party-Category field which is sometimes used to carry the indication of an emergency call in ISUP/TUP (ISDN User Part/Telephone User Part) based systems. Typically, the ISUP/TUP signaling information does not allow for a granularity as fine as the emergency urn:service:sos identifiers defined in RFC 5031.

FIG. 1 illustrates a system 10 that includes one or more components associated with an IMS network 120. A UE 110 may be any end user device or system that can connect to the IMS network 120. Examples of the UE 110 can include, but are not limited to, mobile phones, fixed line phones, mobile wireless devices (including digital, cellular, or dual mode devices), personal digital assistants, laptop/tablet/notebook computers, and desktop computers. The UE 110 can communicate via the IMS network 120 with a PSAP 130, which may be a 911 system or another emergency call center or system.

The IMS network 120 might include any well known set of components, such as base stations and other radio transmission and reception equipment, that can promote an IMS-based connection between the UE 110 and the PSAP 130. Other components that might be present in the IMS network 120 but that are not shown include a P-CSCF (Proxy Call Session Control Function) that may be the first point of contact for the UE 110; an S-CSCF (Serving CSCF) that may perform session control, downloading and uploading of user profiles, and other functions; an E-CSCF (Emergency CSCF) that may provide session control functions for the PSAP 130; and other well known components for initiating and maintaining IMS-based sessions.

To make an emergency call, the UE 110 might send an initial SIP request for a dialog or standalone transaction, or unknown method (e.g. a SIP INVITE request) 140, or a similar invitation message, to the PSAP 130 via the IMS network 120. The PSAP 130 typically responds to the invitation message 140 with a SIP 1xx or SIP 2xx response (e.g., SIP 200 OK) message 150, or a similar response message. Alternatively, the PSAP 130 could transmit a target refresh request (e.g. re-INVITE request). Standard SIP procedures might then be followed to establish the emergency call between the UE 110 and the PSAP 130.

In an embodiment, the response message 150 includes an indicator 160 that indicates that the call placed by the UE 110 was an emergency call. The indicator 160 may be a bit, a flag, or some other data element that is recognizable by the UE as a designation that a call placed by the UE 110 was an emergency call (e.g., emergency service URNs as specified in RFC 5031 such as urn:service:sos, urn:service:sos.animal-control, or urn:service:sos.police, if it is determined that the call that was placed can be categorized as, e.g., a urn:service:sos call, a urn:service:sos.animal-control call, or a urn:service:sos.police call). When the UE 110 receives the response message 150 that includes the indicator 160, the UE 110 identifies that the call it placed was an IMS emergency call and can then take appropriate actions and invoke functionality for an emergency call. One action that the UE 110 might take is to indicate to the UE user the nature of the original call. That is, the UE 110 might alert the user that the call was an emergency call. The alert might be a message that appears on the display screen of the UE 110, a visual or audible alert, or some other type of environmental condition or indication of the nature of the call. Other actions taken by the UE 110 can involve transmitting a SIP request message 170 such as a SIP ACK or SIP PRACK message or any subsequent SIP request part of the dialog (including target refresh requests) or request for a new dialog, where the request for the dialog uses the SIP Target-Dialog header field with a value set identical to the corresponding dialog identifier value for the emergency session. In the case of sending a request for a new dialog message 170 with SIP Target-Dialog header field set, it can indicate to the recipient that the sender is aware of an existing dialog with the recipient, either because the sender is on the other side of that dialog, or because it has access to the dialog identifiers, the recipient can then authorize the request based on this awareness. Subject to limitations of SIP, either of these messages can include information in the request as part of information available to the PSAP 130 if the recipient is the PSAP 130. As mentioned, the message 170 might be a SIP target refresh request, a SIP UPDATE, a SIP re-INVITE message 170, or a similar (acknowledgement) message (e.g. SIP PRACK). The message 170 can include information 180 about the UE 110, to be described in detail below. Due to limitations in the SIP protocol, the information 180 may be spread over several SIP messages, e.g. some information may be in SIP PRACK requests, some in responses to PSAP- or network-originated requests or SIP UPDATE requests, and some in other SIP target refresh requests. The information 180 might be intended for the PSAP 130 or for one or more components in the IMS network 120. The information 180 could optionally include a flag or other indicator that indicates that certain emergency-related information, such as identification, network access, and location information, is not to be shared (e.g., with the PSAP 130). If one or more privacy indicators are set, the network might still be able to use the emergency-related information for routing purposes or to provide anonymous call-back.

In another embodiment, a policy could be stored in the UE 110. The policy or policies can be used to determine if including one or more indicators to request privacy when requesting emergency sessions is allowed, or if emergency-related information is provided when a PSAP makes a call-back, or if it is allowed to request privacy when emergency-related information is provided in response to a PSAP call-back. The policy could be consulted when the UE 110 wants to divulge information that is sensitive to privacy, such as, but not limited to, location. The policy could be user-provided, operator-provided, or both. When the information is both user-provided and operator-provided, the operator might provide a default policy, but the user might be able to override this policy if they so wish. The policy can be stored in memory that is either internal or external to the device.

It is possible that the policy/preference could be set up in a way that is against the PSAP's regulatory requirements. For example, the UE 110 might come from a country where it can choose whether or not to provide user-related or event-related information, and the policy/preference may be set such that the information will not be provided. Alternatively, the policy/preference may be set such that the information may be provided (e.g., for the purposes of determining the nearest PSAP), but a request might be made that the information not be released. The UE 110 may subsequently go to a country where by law location information must be provided if available. In such cases, the network might signal to the UE 110 that the policy/preference is overridden and that information must be provided. This override notification could be signaled as a token in a message from the network. For example, a SIP message could contain a token that is coded as a new feature tag, a new URI parameter, an XML body, an SDP parameter, or a similar coding feature. The token might also need the property that it can be trusted by the UE 110.

The following illustrates one possible embodiment of how the UE 110 may behave.
Basic procedure will be
  Policy/Preference set
  Message received from network containing override token
    Consult preference/policy
      Allow location information provide
      Not allowed determine if token received
        Token received ascertain authenticity of token and if valid provide location information
        Token received, fake, provide indication to network fake token received, provide no location information.

The token could be carried in a callback from the PSAP 130, such as a SIP INVITE. Alternatively, the token could be provided at the time the UE 110 makes registration with the network 120, such that in IMS the token could be provided in a SIP 200OK message in response to an emergency registration. Within the 200OK, if the token is coded as a new feature tag, a new URI parameter, or an XML body, the token might be a secure token. In an LTE/SAE network, the 200OK message could be transmitted in response to a request to attach to the network or as part of the authentication sequence of the UE 110.

Another embodiment is that the VPLMN policy could be broadcast in a system message indicating the behavior of the UE should it receive an emergency callback.

The provisioning of the policy can be performed in, but is not limited to, one of the following ways: OMA DM, CP, OTA, proprietary, or other. When being provisioned, any of the following transports could be used: Cell Broadcast, SMS, USSD, MBMS, Generic IP pipe, or other.

The policy might be stored in internal or external memory. External memory might be, but is not limited to, PC Card PCMCIA, CompactFlash I CF-I, CompactFlash II CF-II, SmartMedia SM/SMC, Memory Stick MS, Memory Stick Duo MSD, Memory Stick PRO Duo MSPD, Memory Stick PRO-HG Duo MSPDX, Memory Stick Micro M2, Multimedia Card MMC, Multimedia Card RS-MMC, MMCmicro Card MMCmicro, Secure Digital Card SD, SxS SxS, Universal Flash Storage UFS, miniSD Card miniSD, microSD Card microSD, xD-Picture Card xD, Intelligent Stick iStick, Serial Flash Module SFM, μ card μcard, NT Card NT NT+, USIM, R-UIM, etc.

In one embodiment of the policy information, there would be a file on the removable memory consisting of eight bits for each file. Bit 1 (the Least Significant Bit) might be set to 1 to indicate that location information is to be provided, or to 0 to indicate that location information is not to be provided. All remaining seven bits could be reserved (RFU). The user preference file could be under PIN control (i.e., the user could, after entering the PIN, control the content of the file), and the operator file could be under ADM (Administrative) control, preventing any party, other than the administrator (the card issuer, usually the carrier) from altering the contents of the file.

In various embodiments, the policy may be implemented in different formats. One example of a format for the policy is provided below, but the formats should not be limited by this example, as other formats are contemplated.
/<X>/Emergency Location policy upon PSAP call back/
The Emergency Location policy leaf indicates whether the LE provides emergency information or not for emergency call back.
Occurrence: One
Format: bool
Access Types: Get, Replace
Values: 0, 1
    0—UE provides emergency information.
    1—UE does not provide emergency information.

```
<Node>
    <NodeName> Emergency Location policy </NodeName>
    <DFProperties>
        <AccessType>
            <Get/>
            <Replace/>
        </AccessType>
        <DFFormat>
            <bool/>
        </DFFormat>
        <Occurrence>
            <One/>
        </Occurrence>
        <DFTitle> Emergency Location policy </DFTitle>
        <DFType>
            <MIME>text/plain</MIME>
        </DFType>
    </DFProperties>
</Node>
```

As mentioned previously, when the UE 110 receives the response message 150 that includes the indicator 160, the UE 110 might transmit information 180 about itself to the PSAP 130. If policy allows, one piece of the information 180 that the UE 110 might include in the SIP message 170 is the UE's public user identities (such as Tel URI, SIP URI, or Mobile Station International ISDN Number (MSISDN)) or some other identifying symbol. Including such information could be subject to policy or could be accompanied by an indicator that private information is not shared with the PSAP or emergency centre or untrusted network elements. The public user identities might be in GRUU format or may contain sufficient information that a callback over Circuit Switch technology is possible, e.g., in Tel URI format. The PSAP 130 can use the identifier to make a callback to the UE 110 if necessary, as described below. Another piece of information 180 that the UE 110 might transmit in the acknowledgement message 170 is the type of access that the UE 110 is using. For example, if the emergency call is being made over a wireless local area network (LAN), the UE 110 might include that fact in the information 180, as well as a cell ID, a line ID, and/or a wireless LAN access node ID. During the dialog, the points of attachment to the IP-Connectivity Access Network (IP-CAN) of the UE can change (e.g., UE connects to different cells). The UE can populate the P-Access-Network-Info header in any request or response within a dialog for which transmission of such information is supported (e.g., excluding ACK requests and CANCEL requests and responses), with the current point of attachment to the IP-CAN (e.g., the current cell information).

If the UE 110 is aware of its geographic location, e.g., through the use of a global positioning system (GPS), the UE 110 can include its location as another piece of the information 180, such as but not limited to Cell Global Identity (CGI), Service Set Identifier (SSID), waypoints such as landmarks, and the signal strength of adjacent cells with corresponding CGIs. If the UE 110 is not aware of its geographic location, location-related data is not included in the information 180. If a GRUU (globally routable UA (user agent) URI (uniform resource identifier)) is associated with the UE 110, the UE's GRUU can be included as another piece of the information 180. Depending on the privacy settings of the user, the GRUU may be a P-GRUU or a T-GRUU, although a public GRUU (P-GRUU) is preferred over a temporary GRUU (T-GRUU).

Other items that can be included in the information 180 might include the capabilities of the UE 100, the radio access technology being used by the UE 110, the battery life of the UE 110, the signal strength, and the network identity (e.g., CGI, SSID, SID). The UE 110 could also invoke what is commonly known as ecall functionality to be sent to the PSAP 130.

Before the emergency request reaches the PSAP 130, it might be handled by one or more components in the IMS network 120. One such component is the P-CSCF. An IMS network component can inspect all requests in order to determine if they are related to emergencies. If a request is determined to relate to an emergency, based on configurations and regulator policies, the network component can determine to reject the request or reformat the request or include the emergency call indicator 160 in a SIP response that is sent to the UE 110. Reformatting the request might be done if the UE provides a T-GRUU and the network operator policy settings (e.g., in the P-CSCF) indicate that the public user identities must be provided. In such a case, the T-GRUU can be replaced with the GRUU. In addition, reformatting of messages to be routed to PSAPs might be done if the message contains P-Preferred-Service header fields, P-Asserted-Service header fields, Accept-Contact header fields containing an IMS Communication Service Identifier (ICSI) value (coded as specified in subclause 7.2A.8.2 in 3GPP TS 24.229) and zero or more IMS Application Reference Identifier (IARI) values (coded as specified in subclause 7.2A.9.2 in 3GPP TS 24.229) that are related to the request in a g.3gpp.app_ref feature tag. The P-Preferred-Service header fields, P-Asserted-Service header fields should not be forwarded to the PSAP or emergency centre. The Accept-Contact header fields should be groomed for ICSI values and IARI values as they may cause interactions when selecting an agent. If the Accept-Contact header field contains g.3gpp.app_ref media feature tags, they and their values shall be removed.

In other words, what is termed "reformatting" can include changing the GRUU from a temporary GRUU into a public GRUU. This is done because a temporary GRUU is invalid if the UE is disconnected and has to reregister. A PSAP cannot make a callback to a temporary GRUU after the UE de-registers and re-registers. Public GRUUs, on the other hand, have the property that they are routable even after the UE de-registers and re-registers (making a PSAP callback to that public GRUU more likely to complete). "Reformatting" can also include not propagating of ICSI or IARI feature tags, P-Preferred-Service header fields, and/or P-Asserted- Service header fields. The presence of such tags or fields might skew the handling of the request at the PSAP and cause the request to be routed based on services supported on the UE rather than, for example, on geographical proximity and type of service requested. Since there is typically an S-SCSF in the session path between the UE, the P-CSCF, the E-CSCF, and the PSAP, these services the UE supposedly supports are typically not activated during the emergency call. So signaling it as part of an emergency request (even when the UE did not realize it is an emergency request and includes ICSI or IARI feature tags, P-Preferred-Service header fields, and/or P-Asserted-Service header fields because it believes the request it makes is a normal request) does not serve any purpose and may only detract/result in routing the requests to other PSAPs than those determined based on location, requested type of service, and RFC 3261 procedures. In a worst case scenario, if a PSAP operator registers its support for said services, it may receive a higher load of emergency service requests than other PSAP operators, possibly leading to delay in the emergency response.

In the embodiments where a component in the IMS network 120 rejects the emergency service request, it can respond with a SIP 3xx message, such as a 300 (Multiple Choices), 301 (Moved Permanently), 302 (Moved Temporarily), 380 (Alternative Service) message, or a SIP 4xx response or a SIP 6xx response. A SIP 380 (Alternative Service) is preferably used to indicate that the UE should try another access technology such as CS, or use/create another secure context/registration such as the context created by the emergency registration. The message can also be used to inform the UE to not use the present context (which might have been created as a result of an emergency registration).

The following are cases where the network may be configured to reject the request: a) the network is not able to handle emergency sessions; b) the IM CN subsystem to which the P-CSCF belongs is not able to handle emergency sessions; c) due to local policy, the network does not handle emergency sessions; d) the network only handles certain types of emergency session requests; e) the UE is roaming; f) the P-CSCF is in a different network than the UE's home operator's network; g) the network does not support emergency sessions for either the geographical location where the UE is located or the IP-CAN to which the UE is attached.

It should be noted that a 3xx redirection response may be valid or routable in the currently attached network only. For example, urn:service:sos.animal-control may be valid in the address book only for some networks to which the UE 110 can attach/register. Usage of an address in the address book can be conditional to the operator or region to which the UE 110 is attach/registered. A 3xx response urging the UE to use another address for this emergency-related request or a request determined to be not related to an emergency should not be followed by simply changing the corresponding address book entry, if present, in the address book.

Two examples can illustrate cases where the network rejects the request because the type of emergency session request is not supported. In the first example, RFC 5031 defines urn:service:sos.animal-control as follows: Animal control typically enforces laws and ordinances pertaining to animal control and management, investigates cases of animal abuse, educates the community in responsible pet ownership and wildlife care, and provides for the housing and care of homeless animals, among other animal-related services. In some jurisdictions, a request to urn:service:sos.animal-control may not be classified as an emergency in the sense that it is subjected to network and operator emergency procedures (e.g. allow or disallow a request to urn:service: sos.animal-control when the UE didn't register or has insufficient credentials). If so configured, the network could either reject with an indication that the call is not actually an emergency or it could reject with an indication that the call is not an emergency and offer alternative steps to be executed such as offering a different URI to contact and/or a different CS network address such as a digit string. Note that, since emergency service URNs are not routable and are not E.164 numbers, the UE may not be able to proceed lacking knowledge of routable addresses or numbers. In those jurisdictions, it would be inappropriate if the UE executed emergency procedures (as specified in 3GPP TS 24.008) and a UE should not automatically contact, for example, "911" or "112"" upon receiving a rejection when contacting, e.g., urn:service:sos.animal-control.

Note that it is possible that a CS-enabled UE has received a list of local CS emergency numbers (e.g. received a result of the Location-Update procedure). A UE could indicate the requested emergency service type in a CS emergency request and be connected to the requested PSAP using procedures in 3GPP TS 24.008. E.g., the following table exists:

TABLE 10

| 5.135d/3GPP TS 24.008: Service Category information element |
| --- |
| Emergency Service Category Value (octet 3) The meaning of the Emergency Category Value is derived from the following settings (Please see 3GPP TS 22.101 clause 8): Bit 1 Police Bit 2 Ambulance Bit 3 Fire Brigade Bit 4 Marine Guard Bit 5 Mountain Rescue Bits 6, 7, 8 are spare and set to "0" Mobile station may set one or more bits to "1" If more than one bit is set to "1", routing to a combined Emergency centre (e.g. ambulance and fire brigade in Japan) is required. If the MSC can not match the received service category to any of the emergency centres, it shall route the call to an operator defined default emergency centre. If no bit is set to "1", the MSC shall route the Emergency call to an operator defined default emergency centre |

However, at present no mapping for urn:service:sos.animal-control exists. A mapping for some other emergency services as defined in RFC 5031 (e.g. urn:service:sos.police) can be made by setting the corresponding bit in Emergency Category Value (e.g. urn:service:sos.police maps to Bit 1 of the Emergency Service Category Value, urn:service:sos.ambulance maps to Bit 2 of the Emergency Service Category Value, urn:service:sos.fire maps to Bit 3 of the Emergency Service Category Value, urn:service:sos.marine maps to Bit 4 of the Emergency Service Category Value, urn:service: sos.mountian maps to Bit 5 of the Emergency Service Category Value). urn:service:sos.animal-control, urn:service:sos.physician, urn:service:sos.poison, urn:service:sos-.gas, and others could map to an Emergency Service Category Value with no bits set "1", causing the call to be routed to an operator-defined default emergency centre. Alternatively, for requests for which no PSAP is supported in the network, the UE could be instructed to make a normal SIP request (using procedures in 3GPP TS 24.228) or setup a normal CS call (using procedures in 3GPP TS 24.008). The network could accomplish such by not indicating an alternative address that cannot be mapped to an Emergency Service Category Value (i.e. not one of the urn:service:sos URNs for which a mapping is standardized). When an emergency request is received by the PSAP but the PSAP cannot handle the request and returns a SIP 380 or a similar message, if a mapping exists on the UE from the given URN to an Emergency Service Category Value, a call shall be setup to that CS PSAP E.164 number automatically.

In the second example: the P-CSCF may determine that the emergency request is made to urn:service:sos.police. However, for example in the Netherlands, contacting the police does not per definition warrant activating emergency procedures. Instead, a special number different from "112" is configured: 0900-8844. Other examples are "19" Police (Albania)", "100" (Police and Fire Brigade (Greek cities)), "100" (Ambulance and Fire Brigade (Belgium)), "112" (Police and Ambulance (Italy)), "112" (General emergency call, all categories (Sweden)), "115" (Fire Brigade (Italy)), "144" (Ambulance (Austria)), "*377" (local police agency or Department of Public Safely office, non-emergency roadside assistance in Texas). Such a number may be a premium service. It could be inappropriate if the UE automatically contacted, for example, "911" or "112" if the network rejects the call to urn:service:sos.police, and it could be inappropriate if the network automatically contacted, for example, 0900-8844 as a regular call as the user, without realizing it, may then automatically receive premium charges. The P-CSCF could provide alternative steps such as providing a digit string, e.g., 0900-8844, in a SIP 3xx response. However, the digit string may be part of a message that identifies that the digit string should be displayed and/or that a textual message should be displayed to indicate the nature of the call that was made and the nature of the number provided.

In one embodiment, the P-CSCF has configurable lists with local and roaming partners' emergency service identifiers which indicate per emergency service identifier the handling. When rejecting the request, a configurable list of alternate emergency service URIs can be included in the response, e.g., signaled as part of the SIP Contact header field. These alternative emergency services can be annotated with alphanumeric information that can be displayed, e.g., when signaled as part of the SIP Contact header field. The alternative emergency services can also be identified, using an XML body with XML elements and XML attributes, as being displayed only if required.

In yet another embodiment, the P-CSCF will not reject the request for an unsupported emergency service type (such as urn:service:sos.poison) but prepare it for forwarding to the user's home network S-CSCF using normal procedures (as opposed to forwarding it to an E-CSCF). The user's home network's S-SCSF should then be configured to handle the unrouteable Request URI value. The IMS network may also be configured to take account of roaming users requesting a session with urn:service:sos.police, such that the service requested by a UE which may be half way around the world, can still be handled in a timely and effective manner. The IMS network could provide an indication in a SIP message to the UE that the call has been determined to not be an emergency call and that its handling will be different. The indication could be a flag and/or alphanumeric information. Possible encodings of this type of indicator are given in this document.

Returning to the case where an IMS network component determines that the UE 110 has initiated an emergency call without recognizing it as such, in some embodiments the IMS network 120 includes the emergency call indicator 160 in a SIP response that is sent to the UE 110. In this case, the indicator 160 is provided during the call setup signaling phase. In other embodiments, the emergency call indicator 160 is included in a message that originates at the PSAP 130. The IMS network 120 then transfers the message from the PSAP 130 to the UE 110.

In other embodiments, if a component in the IMS network 120 includes the emergency call indicator 160 in the SIP response that is sent to the UE 110, the UE 110 can abort the current signaling and initiate regular emergency call setup procedures, which may involve originating a call over a Circuit Switched network, if capable and available, or after initiating emergency registration procedures, or sending a SIP INVITE request containing an indicator indicating that the SIP INVITE request is an emergency-related call request and containing emergency-related information about itself.

Figure 2:
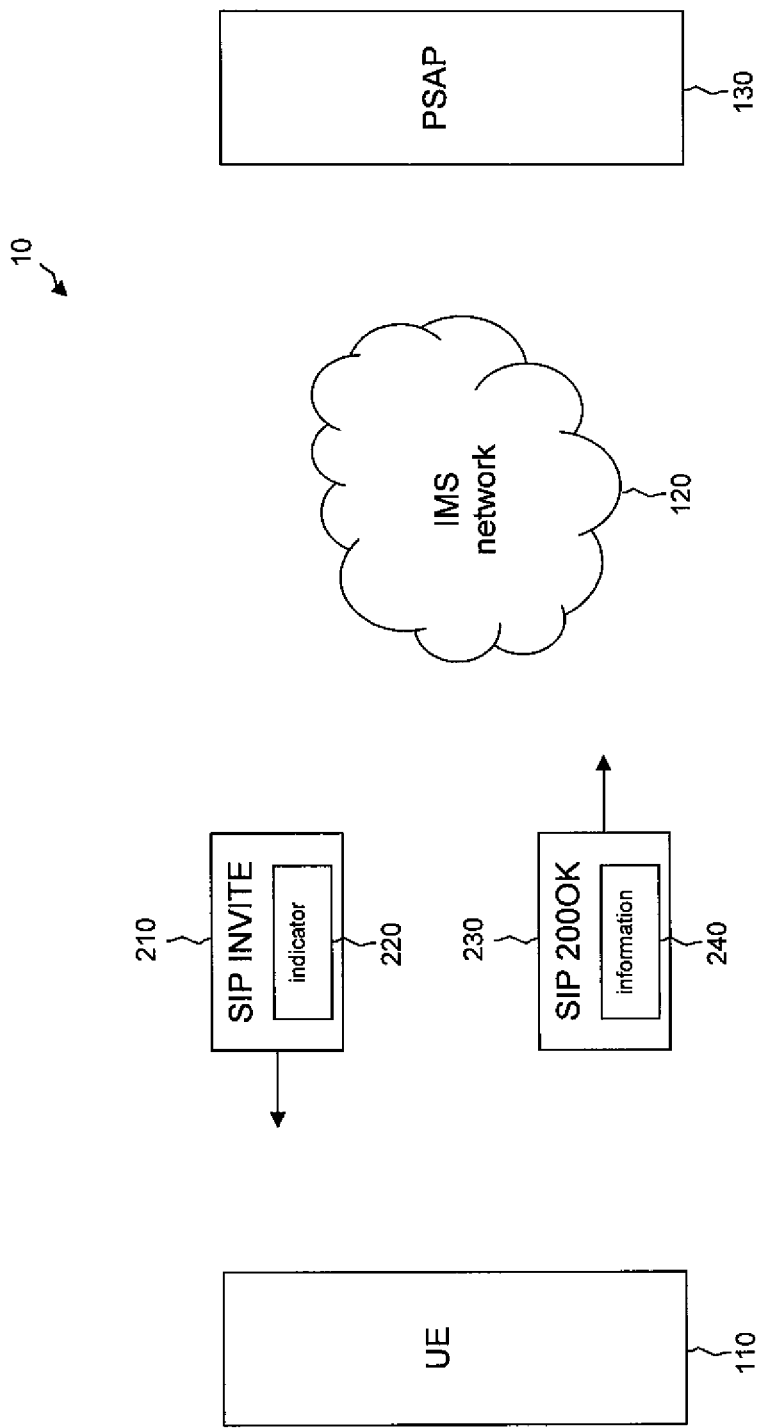
FIG. 2 is a diagram of an illustrative IP network including a UE and a PSAP according to another embodiment of the disclosure.

Information that is similar to the information 180 that the UE 110 includes in the SIP message 170 might be included by the UE 110 in a message sent under different circumstances. This is illustrated in FIG. 2, where the UE 110, the IMS network 120, and the PSAP 130 are again present. However, in this case the PSAP 130 initiates a callback to the UE 110. As is well known in the art, after an emergency call is terminated, the PSAP 130 may place a callback to the UE 110 for various reasons. For example, if the emergency call appears to have terminated abnormally, the PSAP 130 might call the UE 110 back to determine if the UE user wishes to convey any additional information. Alternatively, the PSAP 130 might call the user back to ask for information that was inadvertently not requested in the initial call. Other reasons for a callback from the PSAP 130 to an emergency caller after the termination of an emergency call may be familiar to one of skill in the art.

The PSAP 130 might initiate the callback by sending a SIP INVITE message 210, or a similar message, to the UE 110 via the IMS network 120. In an embodiment, the SIP INVITE message 210 contains an indicator 220 that indicates that the SIP INVITE message 210 is related to an emergency callback. The indicator 220 might be substantially similar to the indicator 160 of FIG. 1 or might be some other type of indicator. The UE 110 can recognize that the indicator 220 is an indication of an emergency callback from the PSAP 130 and can respond to the indicator 220 appropriately by invoking emergency callback functionality, subject to policies. In an embodiment, the response of the UE 110 to receiving the indicator 220 is substantially similar to the response that the UE 110 had upon receiving the indicator 160 of FIG. 1.

For example, one action that the UE 110 might take upon recognizing the indicator 220 is visually or audibly indicating the nature of the session to the user. That is, the UE 110 might alert the user that the incoming call is an emergency callback. The alert might be a message that appears on the display screen of the UE 110 or some other type of indication of the nature of the call. Other actions taken by the UE 110 can involve transmitting a SIP 2xx or 1xx response (e.g. SIP 200(OK) response) 230, or a similar message, that includes information 240 about the UE 110, subject to policies. Alternatively, due to limitations in SIP, the information 240 can be transmitted over several SIP messages or network messages (e.g., UE-provided IP-CAN identity information may not be completely reliable and hence a mechanism based on network provision (e.g., using Policy Control and Charging (PCC)) can provide such information) or within a target refresh request such as a SIP re-INVITE request or an UPDATE request or partially in a SIP PRACK request. The information 240 might be substantially similar to the information 180 that the UE 110 provided upon receiving the indicator 160 of FIG. 1.

One piece of the information 240 that the UE 110 might send to the PSAP 130 is the UE's public user identity or some other identifying symbol. Another piece of information 240 that the UE 110 might transmit in the SIP 200OK message 230 is the type of access that the UE 110 used for the original emergency call. For example, if the emergency call was made over a wireless LAN, the UE 110 might include that fact in the information 240, as well as a cell ID, a line ID, and/or a wireless LAN access node ID.

If the UE 110 is aware of its geographic location, through the use of a GPS system for example, the UE 110 can include its location as another piece of the information 240. If the UE 110 is not aware of its geographic location, location-related data is not included in the information 240. If a GRUU is associated with the UE 110, the UE's GRUU can be included as another piece of the information 240.

In an alternative embodiment, the PSAP 130 might setup a Circuit Switched (CS) call and a CS gateway might then convert the call and the signaling in packet switched technology if the CS call is routed to the CS gateway. Triggered by the incoming call from the PSAP 130, the CS gateway might initiate the callback over packet switched technology by sending a SIP INVITE message 210, or a similar message, to the UE 110 via the IMS network 120.

Figure 3:
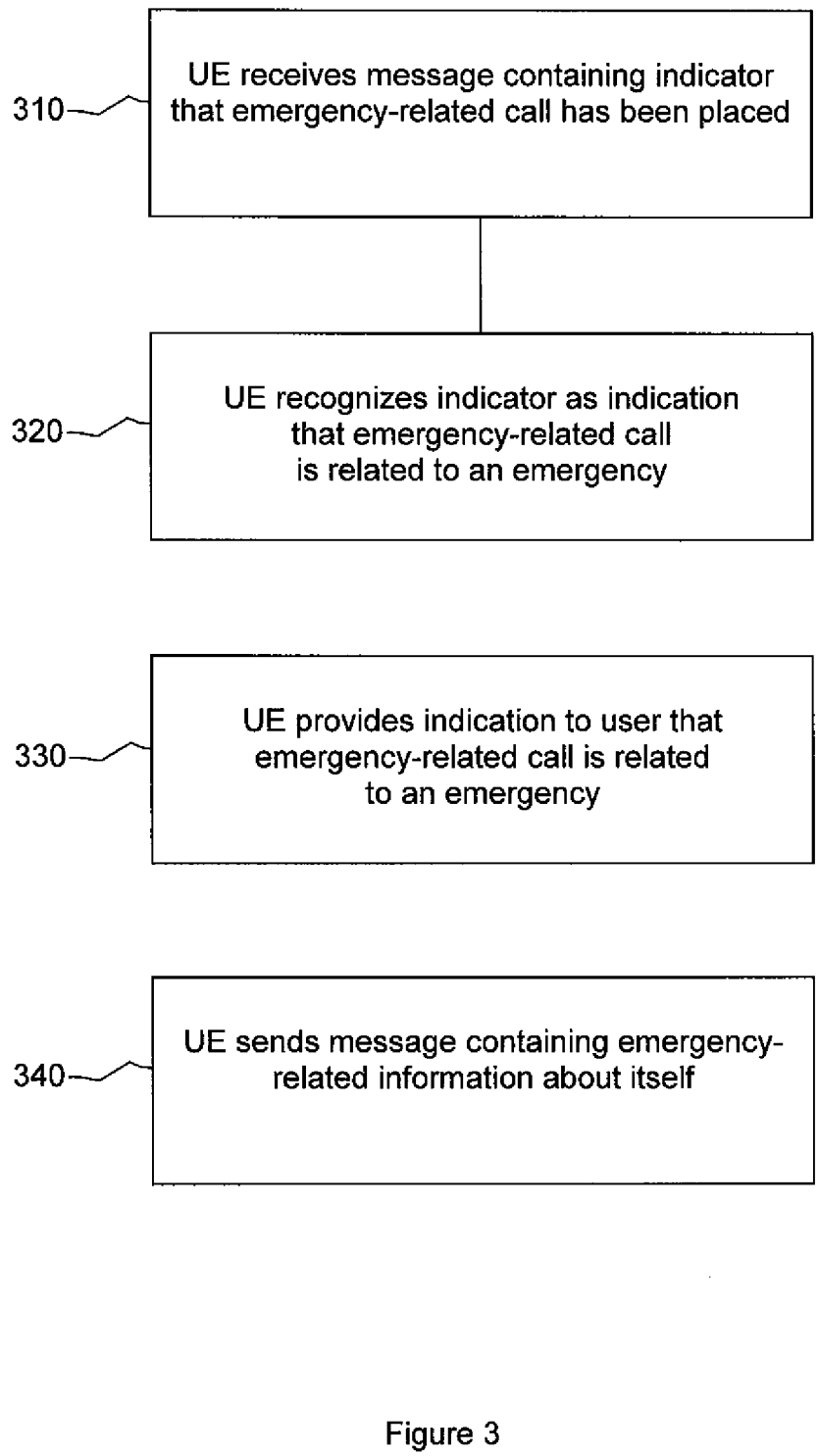
FIG. 3 is a diagram illustrating a method for a UE to respond to an emergency-related message according to an embodiment of the disclosure.

FIG. 3 illustrates an embodiment of a method 300 for a UE to respond to an emergency-related message sent to the UE. In block 310, the UE receives a message containing an indicator indicating that an emergency-related call has been placed. In some cases, the emergency-related call may have been placed by the UE without the UE being aware that the call was related to an emergency. In other cases, the emergency-related call might be a callback from a PSAP to the UE in response to a previous emergency call from the UE. In block 320, the UE recognizes the indicator as an indication that its first message (initial SIP request for a dialog or standalone transaction, or unknown method or similar message) is related to an emergency. Optionally, in block 330, the UE provides a visual, audible, or other indication to the UE user that the emergency-related call is related to an emergency. In block 340, the UE sends a message containing emergency-related information about itself.

The disclosure described herein might be implemented as one or more modifications to the Third Generation Partnership Project (3GPP) Technical Specification (TS) 24.229 "Internet Protocol (IP) Multimedia Call Control Protocol Based on Session Initiation Protocol (SIP) and Session Description Protocol (SDP); Stage 3". Proposed additions and modifications to TS 24.229, according to various embodiments of the present disclosure, are provided below.

The following addition to 3GPP TS 24.229 applies to the initial INVITE request in the UE-originating case of a call initiation:

In the event the UE receives a 380 (Alternative Service) response to an INVITE request the response containing a XML body that includes an <alternative service> element with the <type> child element's "alternate" attribute containing one or more emergency service URIs, the UE can attempt a normal call as described in subclause 5.1.3.1 using a emergency service URI or using call setup according to the procedures described in 3GPP TS 24.008 [8]. The behavior of the UE is implementation specific if the <type> child element's "alternate" attribute is absent or contains no emergency service URIs.

The following modification to 3GPP TS 24.229 applies to general emergency service:

The P-CSCF shall store a configurable list of local emergency service identifiers, i.e. emergency numbers and the emergency service URN, which are valid for the operator to which the P-CSCF belongs to. In addition to that, the P-CSCF shall store a configurable list of roaming partners' emergency service identifiers. The configurable lists with local and roaming partners' emergency service identifiers shall indicate per emergency service identifier the handling. When the handling indicated that the request shall be rejected, a configurable list of alternate emergency service URIs may be included in the response.

The following addition to 3GPP TS 24.229 applies to the general treatment for all dialogs and standalone transactions excluding the REGISTER method after emergency registration:

If the P-CSCF detects that the Request-URI of the initial request for a dialog, or a standalone transaction, or an unknown method matches an unsupported type of emergency in the VPLMN or HPLMN's emergency service identifiers, the P-CSCF shall:

shall respond to the INVITE request with a 380 (Alternative Service) response;

shall assume that the UE supports version 1 of the XML Schema for the IM CN subsystem XML body if support for the 3GPP IMS XML body in the Accept header is not indicated; and shall include in the 380 (Alternative Service) response:
  a Content-Type header field with the value set to associated MIME type of the 3GPP IMS XML body as described in subclause 7.6.1.

The body shall contain:
a) an <alternative-service> element, set to the parameters of the alternative service;
b) if the Accept header indicates support for version 2 of the XML Schema for the IM CN subsystem XML body then, a <type> child element with an "alternate" attribute set to a list of alternate emergency service URIs, otherwise, a <type> child element, set to "emergency";
c) a <reason> child element, set to an operator configurable reason.

The following, alternative addition to 3GPP TS 24.229 applies to the general treatment for all dialogs and standalone transactions excluding the REGISTER method after emergency registration:

If the P-CSCF detects that the Request-URI of the initial request for a dialog, or a standalone transaction, or an unknown method matches an unsupported type of emergency in the VPLMN or HPLMN's emergency service identifiers, the P-CSCF shall:

shall respond to the INVITE request with a 380 (Alternative Service) response;

shall assume that the UE supports version 1 of the XML Schema for the IM CN subsystem XML body if support for the 3GPP IMS XML body in the Accept header is not indicated; and shall include in the 380 (Alternative Service) response:
  a Content-Type header field with the value set to associated MIME type of the 3GPP IMS XML body as described in subclause 7.6.1.

The body shall contain:
a) an <alternative-service> element, set to the parameters of the alternative service;
b) a <type> child element with an "alternate" attribute set to a list of alternate emergency service URIs,
c) a <reason> child element, set to an operator configurable reason.

The following modification to 3GPP TS 24.229 applies to the general treatment for all dialogs and standalone transactions excluding the REGISTER method for a non-emergency registration:

If the P-CSCF receives an initial request for a dialog, or a standalone transaction, or an unknown method, for a registered user the P-CSCF shall inspect the Request URI independent of values of possible entries in the received Route headers for known emergency service identifiers, i.e. emergency numbers and the emergency service URN from these configurable lists. If the P-CSCF detects that the Request-URI of the initial request for a dialog, or a standalone transaction, or an unknown method matches one of the emergency service identifiers in any of these lists, the P-CSCF shall:

0) determine the geographical location of the UE. Access technology specific procedures are described in each access technology specific annex. If the P-CSCF is not capable to handle emergency sessions or due to local policy does not handle emergency sessions or only handles certain type of emergency session request or the IP-CAN to which the UE is attached or the UE is roaming or the P-CSCF is in a different network than the UE's home operator's network, then the P-CSCF:

shall reject the request by returning a 380 (Alternative Service) response to the UE;

shall assume that the UE supports version 1 of the XML Schema for the IM CN subsystem XML body if support for the 3GPP IMS XML body in the Accept header is not indicated; and shall include in the 380 (Alternative Service) response:
a Content-Type header field with the value set to associated MIME type of the 3GPP IMS XML body as described in subclause 7.6.1.

The body shall contain:
a) an <alternative-service> element, set to the parameters of the alternative service;
b) if the Accept header indicates support for version 2 of the XML Schema for the IM CN subsystem XML body
then, a <type> child element with an "alternate" attribute set to a list of alternate emergency service URIs, and
if the initial request for a dialog, or standalone transaction, or unknown method was for a supported type of emergency, the <type> child element is set to "emergency" to indicate that it was a supported emergency call,
otherwise, a <type> child element, set to "emergency";
c) a <reason> child element, set to an operator configurable reason; and
d) an <action> child element, set to "emergency-registration" if the request included an emergency service URN in the Request-URI.

NOTE 1: Roaming is when a UE is in a geographic area that is outside the serving geographic area of the home IM CN subsystem.

NOTE 1a: "sip:911@example.com;user=phone" could be an alternate emergency service URI. "urn:service:sos.animal-control" could be an unsupported type of emergency call.

NOTE 2: Emergency service URN in the request-URI indicates for the network that the emergency call attempt is recognized by the UE.

The following alternative modification to 3GPP TS 24.229 applies to the general treatment for all dialogs and standalone transactions excluding the REGISTER method for a non-emergency registration:

If the P-CSCF receives an initial request for a dialog, or a standalone transaction, or an unknown method, for a registered user the P-CSCF shall inspect the Request URI independent of values of possible entries in the received Route headers for known emergency service identifiers, i.e. emergency numbers and the emergency service URN from these configurable lists. If the P-CSCF detects that the Request-URI of the initial request for a dialog, or a standalone transaction, or an unknown method matches one of the emergency service identifiers in any of these lists, the P-CSCF shall:

0) determine the geographical location of the UE. Access technology specific procedures are described in each access technology specific annex. If the P-CSCF is not capable to handle emergency sessions or due to local policy does not handle emergency sessions or only handles certain type of emergency session request or the IP-CAN to which the UE is attached or the UE is roaming or the P-CSCF is in a different network than the UE's home operator's network, then the P-CSCF:

shall reject the request by returning a 380 (Alternative Service) response to the UE;

shall assume that the UE supports version 1 of the XML Schema for the IM CN subsystem XML body if support for the 3GPP IMS XML body in the Accept header is not indicated; and shall include in the 380 (Alternative Service) response:
a Content-Type header field with the value set to associated MIME type of the 3GPP IMS XML body as described in subclause 7.6.1.

The body shall contain:
a) an <alternative-service> element, set to the parameters of the alternative service;
b) a <type> child element with an "alternate" attribute set to a list of alternate emergency service URIs, and
if the initial request for a dialog, or standalone transaction, or unknown method was for a supported type of emergency, the <type> child element is set to "emergency" to indicate that it was a supported emergency call;
c) a <reason> child element, set to an operator configurable reason; and
d) an <action> child element, set to "emergency-registration" if the request included an emergency service URN in the Request-URI.

NOTE 1: Roaming is when a UE is in a geographic area that is outside the serving geographic area of the home IM CN subsystem.

NOTE 2: Emergency service URN in the request-URI indicates for the network that the emergency call attempt is recognized by the UE.

The following modification to 3GPP TS 24.229 applies to abnormal cases:

If the IM CN subsystem to where the P-CSCF belongs to is not capable to handle emergency sessions or due to local policy does not handle emergency sessions or only handles certain type of emergency session request or does not support emergency sessions for either the geographical location of the UE is located or the IP-CAN to which the UE is attached, the P-CSCF shall not forward the INVITE request. The P-CSCF:

shall respond to the INVITE request with a 380 (Alternative Service) response;

shall assume that the UE supports version 1 of the XML Schema for the IM CN subsystem XML body if support for the 3GPP IMS XML body in the Accept header is not indicated; and shall include in the 380 (Alternative Service) response:
  a Content-Type header field with the value set to associated MIME type of the 3GPP IMS XML body as described in subclause 7.6.1.

The body shall contain:
  a) an <alternative-service> element, set to the parameters of the alternative service;
  b) if the Accept header indicates support for version 2 of the XML Schema for the IM CN subsystem XML body
    then, a <type> child element with an "alternate" attribute set to a list of alternate emergency service URIs, and
      if the initial request for a dialog, or standalone transaction, or unknown method was for a supported type of emergency, the <type> child element is set to "emergency" to indicate that it was a supported emergency call,
      otherwise, a <type> child element, set to "emergency";
  c) a <reason> child element, set to an operator configurable reason; and
  d) an <action> child element, set to "emergency-registration" if the request included an emergency service URN in the Request-URI.

NOTE 1: Emergency service URN in the request-URI indicates for the network that the emergency call attempt is recognized by the UE.

NOTE 1a: "sip:911@example.com;user=phone" could be an alternate emergency service URI. "urn:service:sos-.animal-control" could be an unsupported type of emergency call.

NOTE 2: Some networks only allow session requests with a Request-URI containing an emergency service URN, i.e. a service URN with a top-level service type of "sos" as specified in draft-ietf-ecrit-service-urn [69].

The following alternative modification to 3GPP TS 24.229 applies to abnormal cases:

If the IM CN subsystem to where the P-CSCF belongs to is not capable to handle emergency sessions or due to local policy does not handle emergency sessions or only handles certain type of emergency session request or does not support emergency sessions for either the geographical location of the UE is located or the IP-CAN to which the UE is attached, the P-CSCF shall not forward the INVITE request. The P-CSCF:
shall respond to the INVITE request with a 380 (Alternative Service) response;
shall assume that the UE supports version 1 of the XML Schema for the IM CN subsystem XML body if support for the 3GPP IMS XML body in the Accept header is not indicated; and
shall include in the 380 (Alternative Service) response:
  a Content-Type header field with the value set to associated MIME type of the 3GPP IMS XML body as described in subclause 7.6.1.

The body shall contain:
  a) an <alternative-service> element, set to the parameters of the alternative service;
  b) a <type> child element with an "alternate" attribute set to a list of alternate emergency service URIs, and
    if the initial request for a dialog, or standalone transaction, or unknown method was for a supported type of emergency, the <type> child element is set to "emergency" to indicate that it was a supported emergency call;
  c) a <reason> child element, set to an operator configurable reason; and
  d) an <action> child element, set to "emergency-registration" if the request included an emergency service URN in the Request-URI.

NOTE 1: Emergency service URN in the request-URI indicates for the network that the emergency call attempt is recognized by the UE.

NOTE 2: Some networks only allow session requests with a Request-URI containing an emergency service URN, i.e. a service URN with a top-level service type of "sos" as specified in draft-ietf-ecrit-service-urn [69].

The following modification might be made to the 3GPP IM CN subsystem XML body XML Schema to implement one or more of the embodiments disclosed herein:

```
<xs:ComplexType name="tType">
  <xs:sequence>
    <xs:element name="emergency" minOccurs="0" maxOccurs="1">
      <xs:complexType/>
    </xs:element>
    <xs:any namespace="##any" processContents="lax"
    minOccurs="0" maxOccurs="unbounded"/>
  </xs:sequence>
  <xs:attribute name="alternate" type="anyURIlist"/>
  <xs:anyAttribute/>
</xs:complexType>
```

The <action> element contains the "alternate" attribute and only the value "emergency-registration" in the present document. The "alternate" attribute can be set to a list of alternate emergency service URIs.

The following two additions to 3GPP TS 24.229 apply to generic procedures applicable to all methods excluding the REGISTER method.

Upon generating an initial request for a dialog, or a standalone transaction, or an unknown method, excluding ACK and CANCEL, the UE shall include the Accept header with "application/sdp", the MIME type associated with the 3GPP IMS XML body (see subclause 7.6.1) and any other MIME type the UE is willing and capable to accept. In the event the UE receives a 380 (Alternative Service) response to an initial request for a dialog, or a standalone transaction, or an unknown method, the response including an IM CN subsystem XML body as described in subclause 7.6 that includes an <alternative service> element with the <type> child element set to "emergency", the UE shall attempt an emergency call as described in subclause 5.1.6.

If 1xx or 2xx response to an initial request for a dialog, or a standalone transaction, or an unknown method, contains an emergency session indicator, then the UE shall send a re-INVITE request method according to RFC 3261 [26], and:
  1) the UE shall indicate the nature of the session to the user;
  NOTE 17 the UE does not change the From header to include a public user identity or the tel URI associated with the public user identity, in this version of the specification.
  2) if available to the UE, and if defined for the access type as specified in subclause 7.2A.4, the UE shall include a P-Access-Network-Info header and it shall contain a location identifier such as the cell id, line id or the identity of the I-WLAN access node;

NOTE 18: The IMS emergency specification in 3GPP TS 23.167 [4B] describes several methods how the UE can get its location information from the access network or from a server. Such methods are not in the scope of this specification.

3) the UE shall insert a P-Preferred-Identity that includes the public user identity or the tel URI associated with the public user identity as described in subclause 4.2;

4) if the UE has its location information available, then the UE shall include it in the following way:

if the UE is aware of the URI that points to where the UE's location is stored, include the URI in the Geolocation header in accordance with draft-ietf-sip-location-conveyance [89]; or if the geographical location information of the UE is available to the UE, include its geographical location information as PIDF location object in accordance with RFC 4119 [90] and include the location object in a message body with the content type application/pidf+xml in accordance with draft-ietf-sip-location-conveyance [89]. The Geolocation header is set to a Content ID in accordance with draft-ietf-sip-location-conveyance [89]; and 5) if the UE has no geographical location information available, the UE shall not include any geographical location information as specified in draft-ietf-sip-location-conveyance [89]; and 6) if a public GRUU value (pub-gruu) has been saved associated with the public user identity and the UE does not indicate privacy of the P-Asserted-Identity, then the UE shall insert the public GRUU (pub-gruu) value in the Contact header as specified in draft-ietf-sip-gruu [93]; otherwise the UE shall include the protected server port in the address in the Contact header.

NOTE 19 according to RFC 3261 [26], a reINVITE request can not be sent while another INVITE transaction is in progress in either direction.

NOTE 20 it is not necessary for this reINVITE request to change the session parameters.

NOTE 21: It is suggested that UE's only use the option of providing a URI when the domain part belongs to the current P-CSCF or S-CSCF provider. This is an issue on which the network operator needs to provide guidance to the end user. A URI that is only resolvable to the UE which is making the emergency call is not desirable.

NOTE 22: During the dialog, the points of attachment to the IP-CAN of the UE can change (e.g. UE connects to different cells). The UE will populate the P-Access-Network-Info header in any request (except ACK requests and CANCEL requests) or response (except CANCEL responses) within a dialog with the current point of attachment to the IP-CAN (e.g. the current cell information).

Applying privacy, including removing location and access network information, if the PSAP is within the network's trust domain, can be performed by IMS network elements such as E-CSCF, IBCF or others. It may be preferred that "session" privacy is requested (i.e. Privacy header field set to include the value "session" since P-Access-Network-Info header field is present in most SIP messages). It may be preferred that the E-CSCF receives location such that it can determine the most applicable PSAP and use it in routing the request to the PSAP or emergency response centre. Privacy requirements according to RFC 4244 may also apply but at present no procedures foresee including history information in an emergency services request. The following two additions to 3GPP TS 24.229 apply to Procedures at the E-CSCF:

When the E-CSCF receives a request for a dialog requesting privacy or standalone transaction requesting privacy or any request or response related to a UE-originated dialog requesting privacy or standalone transaction requesting privacy, and if local operator policy allows user request for suppression of public user identifiers and location information, the E-CSCF shall:

apply any privacy required by RFC 3323 [33] relating to privacy and RFC 3325 [34] to the P-Asserted-Identity header;

if present, remove the P-ACCESS-NETWORK-INFO header field;

if present, remove the location object from the message's body and remove the content type application/pidf+xml from the Content-Type header field;

if present, remove the Geolocation header field.

NOTE: Operator policies (e.g. requirements for support of emergency communications) may over-ride the user request for suppression.

6) select, based on location information and optionally type of emergency service:

a PSAP connected to the IM CN subsystem network and add the PSAP URI to the topmost Route header; or NOTE 3: If the user did not request privacy, the E-CSCF conveys the P-Access-Network-Info header containing the location identifier, if defined for the access type as specified in subclause 7.2A.4, to the PSAP.

a PSAP in the PSTN, add the BGCF URI to the topmost Route header and add a PSAP URI in tel URI format to the Request-URI with an entry used in the PSTN/CS domain to address the PSAP;

NOTE 4: If the user did not request privacy, the E-CSCF conveys the P-Access-Network-Info header containing the location identifier, if defined for the access type as specified in subclause 7.2A.4, towards the MGCF. The MGCF can translate the location information if included in INVITE (i.e. both the geographical location information in PIDF-LO and the location identifier in the P-Access-Network-Info header) into ISUP signalling, see 3GPP TS 29.163 [11B].

NOTE 5: The E-CSCF can request location information and routing information from the LRF. The E-CSCF can for example send the location identifier to LRF and LRF maps the location identifier into the corresponding geographical location information that LRF sends to E-CSCF. The LRF can invoke an RDF to convert the location information into a proper PSAP/EC URI. Both the location information and the PSAP URI are returned to the E-CSCF.

NOTE 6: The way the E-CSCF determines the next hop address when the PSAP address is a tel URI is implementation dependent.

7) If the user did not request privacy and if the E-CSCF receives a reference number from the LRF the E-CSCF shall include the reference number in the P-Asserted-Identity header;

NOTE 7: The reference number is used in the communication between the PSAP and LRF.

Figure 4:
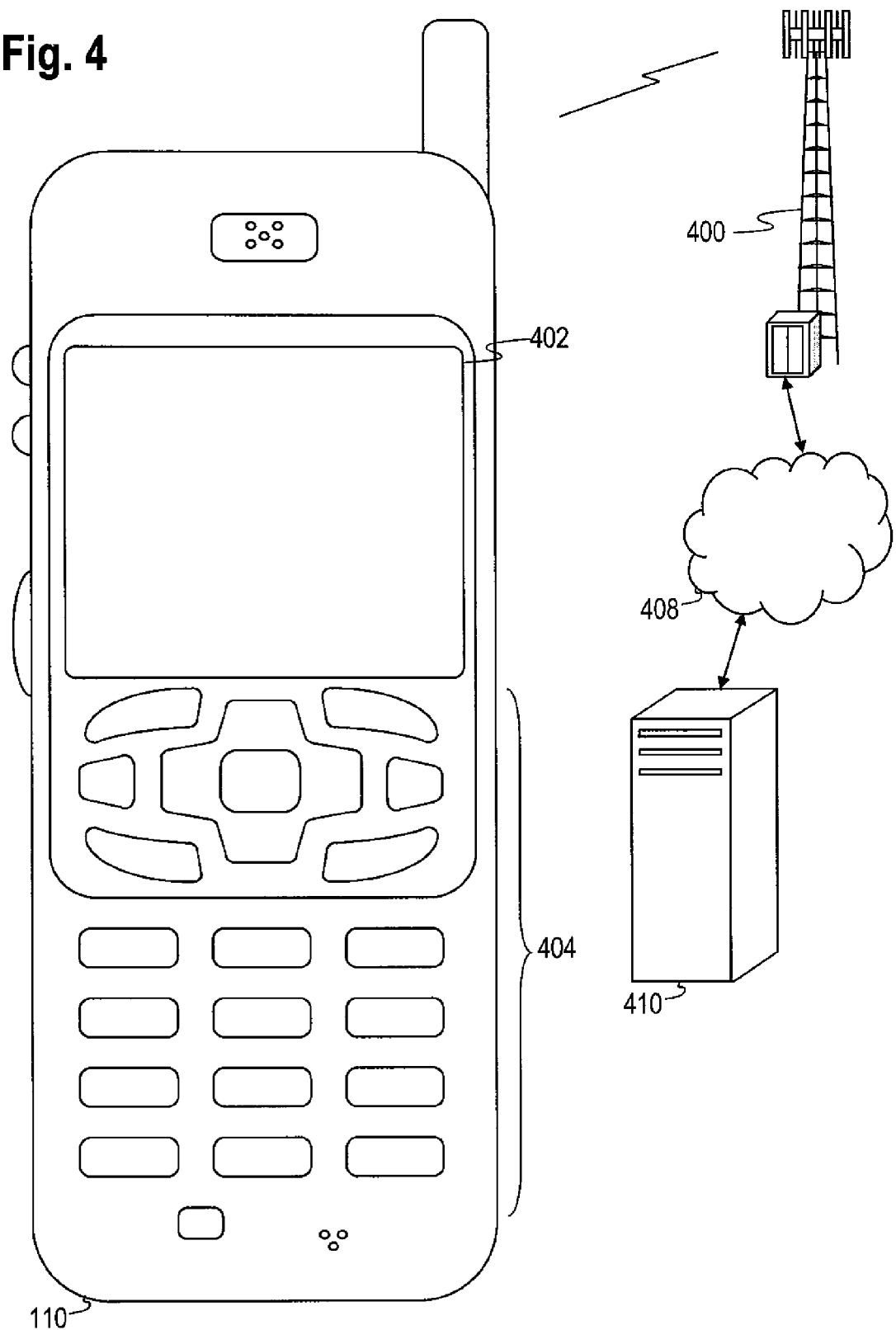
FIG. 4 is a diagram of a wireless communications system including user equipment operable for some of the various embodiments of the disclosure.

FIG. 4 illustrates a wireless communications system including an embodiment of the UE 110. The UE 110 is operable for implementing aspects of the disclosure, but the disclosure should not be limited to these implementations. Though illustrated as a mobile phone, the UE 110 may take various forms including a wireless handset, a pager, a personal digital assistant (PDA), a portable computer, a tablet computer, or a laptop computer. Many suitable devices combine some or all of these functions. In some embodiments of the disclosure, the UE 110 is not a general purpose computing device like a portable, laptop or tablet computer, but rather is a special-purpose communications device such as a mobile phone, wireless handset, pager, or PDA. In another embodiment, the UE 110 may be a portable, laptop or other computing device. The UE 110 may support specialized activities such as gaming, inventory control, job control, and/or task management functions, and so on.

The UE 110 includes a display 402. The UE 110 also includes a touch-sensitive surface, a keyboard or other input keys generally referred as 404 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may include a trackwheel, an exit or escape key, a trackball, and other navigational or functional keys, which may be inwardly depressed to provide further input function. The UE 110 may present options for the user to select, controls for the user to actuate, and/or cursors or other indicators for the user to direct. The UE 110 may further accept data entry from the user, including numbers to dial or various parameter values for configuring the operation of the UE 110. The UE 110 may further execute one or more software or firmware applications in response to user commands. These applications may configure the UE 110 to perform various customized functions in response to user interaction. Additionally, the UE 110 may be programmed and/or configured over-the-air, for example from a wireless base station, a wireless access point, or a peer UE 110.

Among the various applications executable by the UE 110 are a web browser, which enables the display 402 to show a web page. The web page may be obtained via wireless communications with a wireless network access node, a cell tower, a peer UE 110, or any other wireless communication network or system 400. The network 400 is coupled to a wired network 408, such as the Internet. Via the wireless link and the wired network, the UE 110 has access to information on various servers, such as a server 410. The server 410 may provide content that may be shown on the display 402. Alternately, the UE 110 may access the network 400 through a peer UE 110 acting as an intermediary, in a relay type or hop type of connection.

Figure 5:
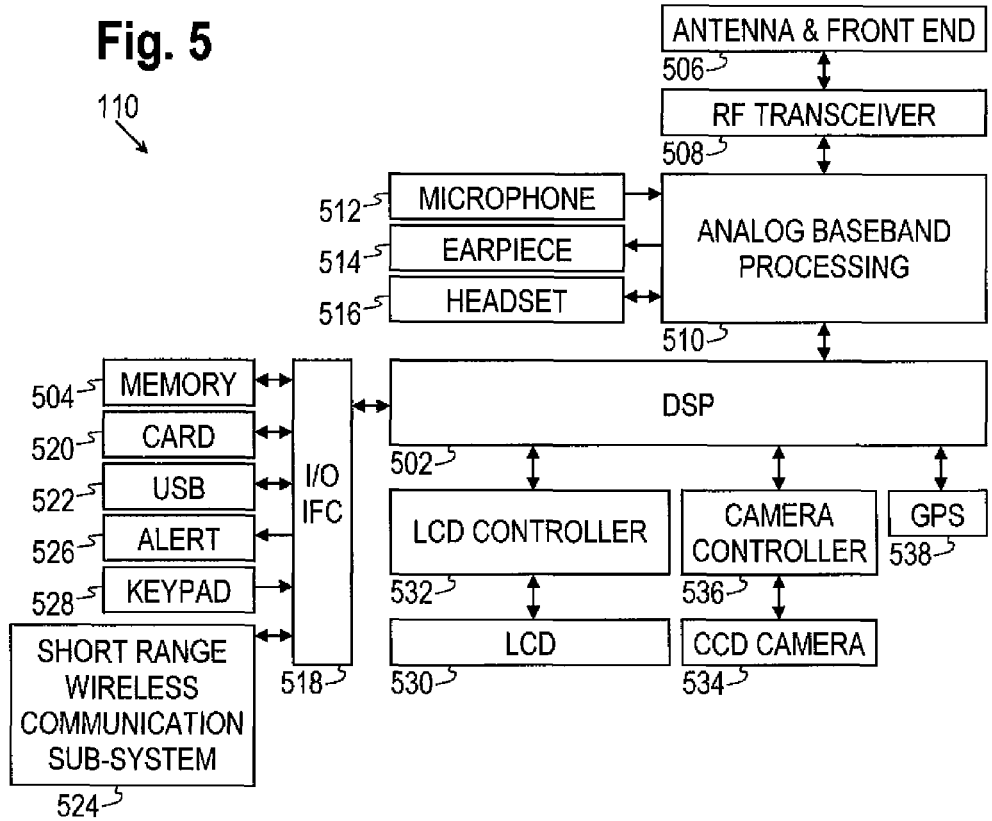
FIG. 5 is a block diagram of user equipment operable for some of the various embodiments of the disclosure.

FIG. 5 shows a block diagram of the UE 110. While a variety of known components of UEs 110 are depicted, in an embodiment a subset of the listed components and/or additional components not listed may be included in the UE 110. The UE 110 includes a digital signal processor (DSP) 502 and a memory 504. As shown, the UE 110 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, a short range wireless communication sub-system 524, an alert 526, a keypad 528, a liquid crystal display (LCD), which may include a touch sensitive surface 530, an LCD controller 532, a charge-coupled device (CCD) camera 534, a camera controller 536, and a global positioning system (GPS) sensor 538. In an embodiment, the UE 110 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the UE 110 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 110 to send and receive information from a cellular network or some other available wireless communications network or from a peer UE 110. In an embodiment, the antenna and front end unit 506 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 506 may include antenna tuning and/or impedance matching components, RF power amplifiers, and/or low noise amplifiers.

The RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 510 and/or the DSP 502 or other central processing unit. In some embodiments, the RF Transceiver 508, portions of the Antenna and Front End 506, and the analog baseband processing unit 510 may be combined in one or more processing units and/or application specific integrated circuits (ASICs).

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports for connecting to the built-in microphone 512 and the earpiece speaker 514 that enable the UE 110 to be used as a cell phone. The analog baseband processing unit 510 may further include a port for connecting to a headset or other hands-free microphone and speaker configuration. The analog baseband processing unit 510 may provide digital-to-analog conversion in one signal direction and analog-to-digital conversion in the opposing signal direction. In some embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 502 may perform modulation, coding, interleaving, and spreading, and for a receiver function the DSP 502 may perform despreading, deinterleaving, decoding, and demodulation. In another embodiment, for example in an orthogonal frequency division multiplex access (OFDMA) technology application, for the transmitter function the DSP 502 may perform modulation, coding, interleaving, inverse fast Fourier transforming, and cyclic prefix appending, and for a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 110 and may also enable the UE 110 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 110 to communicate wirelessly with other nearby UEs and/or wireless base stations.

The input/output interface 518 may further connect the DSP 502 to the alert 526 that, when triggered, causes the UE 110 to provide a notice to the user, for example, by ringing, playing a melody, or vibrating. The alert 526 may serve as a mechanism for alerting the user to any of various events such as an incoming call, a new text message, and an appointment reminder by silently vibrating, or by playing a specific pre-assigned melody for a particular caller.

The keypad 528 couples to the DSP 502 via the interface 518 to provide one mechanism for the user to make selections, enter information, and otherwise provide input to the UE 110. The keyboard 528 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 530, which may include touch screen capability and also display text and/or graphics to the user. The LCD controller 532 couples the DSP 502 to the LCD 530.

The CCD camera 534, if equipped, enables the UE 110 to take digital pictures. The DSP 502 communicates with the CCD camera 534 via the camera controller 536. In another embodiment, a camera operating according to a technology other than Charge Coupled Device cameras may be employed. The GPS sensor 538 is coupled to the DSP 502 to decode global positioning system signals, thereby enabling the UE 110 to determine its position. Various other peripherals may also be included to provide additional functions, e.g., radio and television reception.

Figure 6:
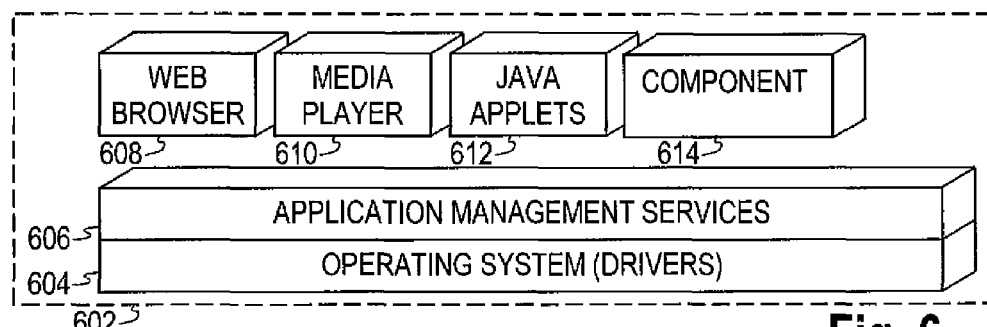
FIG. 6 is a diagram of a software environment that may be implemented on user equipment operable for some of the various embodiments of the disclosure.

FIG. 6 illustrates a software environment 602 that may be implemented by the DSP 502. The DSP 502 executes operating system drivers 604 that provide a platform from which the rest of the software operates. The operating system drivers 604 provide drivers for the node hardware with standardized interfaces that are accessible to application software. The operating system drivers 604 include application management services ("AMS") 606 that transfer control between applications running on the UE 110. Also shown in FIG. 6 are a web browser application 608, a media player application 610, and Java applets 612. The web browser application 608 configures the UE 110 to operate as a web browser, allowing a user to enter information into forms and select links to retrieve and view web pages. The media player application 610 configures the UE 110 to retrieve and play audio or audiovisual media. The Java applets 612 configure the UE 110 to provide games, utilities, and other functionality. A component 614 might provide functionality described herein.

Figure 7:
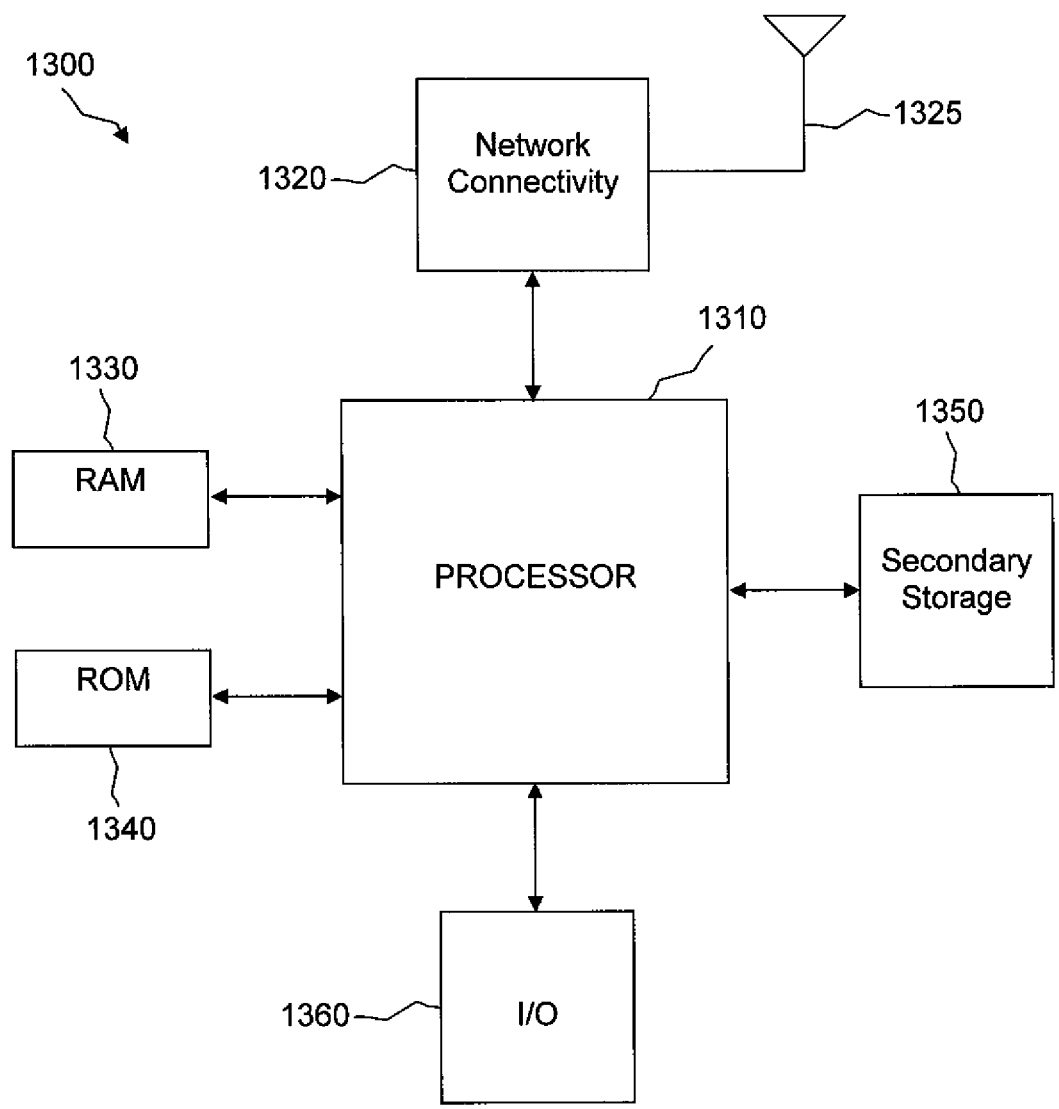
FIG. 7 is an illustrative computing system suitable for some of the various embodiments of the disclosure.

The UE 110 and other components described above might include a processing component that is capable of executing instructions related to the actions described above. FIG. 7 illustrates an example of a system 1300 that includes a processing component 1310 suitable for implementing one or more embodiments disclosed herein. In addition to the processor 1310 (which may be referred to as a central processor unit or CPU), the system 1300 might include network connectivity devices 1320, random access memory (RAM) 1330, read only memory (ROM) 1340, secondary storage 1350, and input/output (I/O) devices 1360. In some cases, some of these components may not be present or may be combined in various combinations with one another or with other components not shown. These components might be located in a single physical entity or in more than one physical entity. Any actions described herein as being taken by the processor 1310 might be taken by the processor 1310 alone or by the processor 1310 in conjunction with one or more components shown or not shown in the drawing.

The processor 1310 executes instructions, codes, computer programs, or scripts that it might access from the network connectivity devices 1320, RAM 1330, ROM 1340, or secondary storage 1350 (which might include various disk-based systems such as hard disk, floppy disk, or optical disk). While only one processor 1310 is shown, multiple processors may be present. Thus, while instructions may be discussed as being executed by a processor, the instructions may be executed simultaneously, serially, or otherwise by one or multiple processors. The processor 1310 may be implemented as one or more CPU chips.

The network connectivity devices 1320 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) and/or global system for mobile communications (GSM) radio transceiver devices, and other well-known devices for connecting to networks. These network connectivity devices 1320 may enable the processor 1310 to communicate with the Internet or one or more telecommunications networks or other networks from which the processor 1310 might receive information or to which the processor 1310 might output information.

The network connectivity devices 1320 might also include one or more transceiver components 1325 capable of transmitting and/or receiving data wirelessly in the form of electromagnetic waves, such as radio frequency signals or microwave frequency signals. Alternatively, the data may propagate in or on the surface of electrical conductors, in coaxial cables, in waveguides, in optical media such as optical fiber, or in other media. The transceiver component 1325 might include separate receiving and transmitting units or a single transceiver. Information transmitted or received by the transceiver 1325 may include data that has been processed by the processor 1310 or instructions that are to be executed by processor 1310. Such information may be received from and outputted to a network in the form, for example, of a computer data baseband signal or signal embodied in a carrier wave. The data may be ordered according to different sequences as may be desirable for either processing or generating the data or transmitting or receiving the data. The baseband signal, the signal embedded in the carrier wave, or other types of signals currently used or hereafter developed may be referred to as the transmission medium and may be generated according to several methods well known to one skilled in the art.

The RAM 1330 might be used to store volatile data and perhaps to store instructions that are executed by the processor 1310. The ROM 1340 is a non-volatile memory device that typically has a smaller memory capacity than the memory capacity of the secondary storage 1350. ROM 1340 might be used to store instructions and perhaps data that are read during execution of the instructions. Access to both RAM 1330 and ROM 1340 is typically faster than to secondary storage 1350. The secondary storage 1350 is typically comprised of one or more disk drives or tape drives and might be used for non-volatile storage of data or as an over-flow data storage device if RAM 1330 is not large enough to hold all working data. Secondary storage 1350 may be used to store programs that are loaded into RAM 1330 when such programs are selected for execution.

The I/O devices 1360 may include liquid crystal displays (LCDs), touch screen displays, keyboards, keypads, switches, dials, mice, track balls, voice recognizers, card readers, paper tape readers, printers, video monitors, or other well-known input devices. Also, the transceiver 1325 might be considered to be a component of the I/O devices 1360 instead of or in addition to being a component of the network connectivity devices 1320. Some or all of the I/O devices 1360 may be substantially similar to various components depicted in the previously described drawing of the UE 110, such as the display 402 and the input 404.

The following 3rd Generation Partnership Project (3GPP) Technical Specification (TS) is incorporated herein by reference: TS 24.229 V7.8.0 (2007-12).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method in a user equipment (UE), the method comprising:
    maintaining in memory, at the UE, one or more Emergency Service Category (ESC) Values, each ESC Value associated with an Emergency Service Uniform Resource Name (URN), wherein the Emergency Service URN is indicative of a type of emergency service from a plurality of types of emergency services;
    receiving at the UE a Session Initiation Protocol (SIP) 380 response message from an Internet Protocol Multimedia (IM) Core Network (CN) Subsystem (IMS) using a first registration, the message including a URN of an emergency service within a Contact header field, the message indicating rejection of an emergency service request from the UE, and the message originated by a Proxy Call Session Control Function (P-CSCF) of the IMS; and
    performing one of using a second registration with IMS and originating a call over a Circuit Switched (CS) network, comprising:
        when using a second registration, creating the second registration with IMS and sending a SIP request message using the second registration towards a Public Safety Answering Point (PSAP), the SIP request message including the URN of the emergency service and emergency-related information associated with the UE;
        when originating a call over a CS network, when the URN of the emergency service is an Emergency Service URN indicative of a type of emergency service associated with an ESC Value as maintained in memory, accessing the CS network and initiating an emergency request message on the CS network indicating the type of emergency service; and
        when originating a call over the CS network and the URN of the emergency service is an Emergency Service URN indicative of a type of emergency service not associated with an ESC Value as maintained in memory, accessing the CS network and initiating a CS call request.

2. The method of claim 1, wherein the SIP 380 response message further comprises an indicator indicating that a first SIP request message, sent by the UE, is an emergency-related request.

3. The method of claim 1, wherein the URN of the emergency service comprises a code identifying a country or a code identifying a region.

4. The method of claim 1, wherein the Emergency Service URN is a service URN with a top-level service type of "sos".

5. The method of claim 1, wherein the SIP 380 response message further comprises a P-Asserted-Identity header field from a node with a trust domain.

6. The method of claim 1, wherein mapping between the Emergency Service URN and the at least one of the one or more Emergency Service Category Values comprises at least one of:
    mapping between the urn:service:sos.police URN value and Bit 1 of the Emergency Service Category Value;

mapping between the urn:service:sos.ambulance URN and Bit 2 of the Emergency Service Category Value;

mapping between the urn:service:sos.fire URN and Bit 3 of the Emergency Service Category Value;

mapping between the urn:service:sos.marine URN and Bit 4 of the Emergency Service Category Value; and mapping between the urn:service:sos.mountain URN and Bit 5 of the Emergency Service Category Value.

7. The method of claim 1, wherein mapping between the Emergency Service URN and the at least one of the one or more Emergency Service Category Values comprises mapping the urn:service:sos URN value to an Emergency Service Category Value with no bits set to "1".

8. The method of claim 1, wherein the SIP 380 response message is a response to a first SIP request message.

9. A user equipment (UE) comprising:

a component configured such that the UE maintains in memory one or more Emergency Service Category (ESC) Values, each ESC Value associated with an Emergency Service Uniform Resource Name (URN), wherein the Emergency Service URN is indicative of a type of emergency service from a plurality of types of emergency services;

receives at the UE a Session Initiation Protocol (SIP) 380 response message from an Internet Protocol Multimedia (IM) Core Network (CN) Subsystem (IMS) using a first registration, the message including a URN of an emergency service within a Contact header field, the message indicating rejection of an emergency service request from the UE, and the message originated by a Proxy Call Session Control Function (P-CSCF) of the IMS; and performs one of using a second registration with IMS and originating a call over a Circuit Switched (CS) network, comprising:

when using a second registration, creates the second registration with IMS and sends a SIP request message using the second registration towards a Public Safety Answering Point (PSAP), the SIP request message including the URN of the emergency service and emergency-related information associated with the UE;

when originating a call over a CS network, accesses the CS network and, when the URN of the emergency service is an Emergency Service URN indicative of a type of emergency service associated with an ESC Value as maintained in memory, initiates an emergency request message on the CS network indicating the type of emergency service; and when originating a call over the CS network and the URN of the emergency service is an Emergency Service URN indicative of a type of emergency service not associated with an ESC Value as maintained in memory, accesses the CS network and initiates a CS call request.

10. The UE of claim 9, wherein the SIP 380 response message further comprises an indicator indicating that a first SIP request message, sent by the UE, is an emergency-related request.

11. The UE of claim 9, wherein the URN of the emergency service comprises a code identifying a country or a code identifying a region.

12. The UE of claim 9, wherein the Emergency Service URN is a service URN with a top-level service type of "sos".

13. The UE of claim 9, wherein the SIP 380 response message further comprises a P-Asserted-Identity header field from a node with a trust domain.

14. The UE of claim 9, wherein mapping between the Emergency Service URN and the at least one of the one or more Emergency Service Category Values comprises at least one of:

mapping between the urn:service:sos.police URN value and Bit 1 of the Emergency Service Category Value;

mapping between the urn:service:sos.ambulance URN and Bit 2 of the Emergency Service Category Value;

mapping between the urn:service:sos.fire URN and Bit 3 of the Emergency Service Category Value;

mapping between the urn:service:sos.marine URN and Bit 4 of the Emergency Service Category Value; and mapping between the urn:service:sos.mountain URN and Bit 5 of the Emergency Service Category Value.

15. The UE of claim 9, wherein mapping between the Emergency Service URN and the at least one of the one or more Emergency Service Category Values comprises mapping the urn: service: sos URN value to an Emergency Service Category Value with no bits set to "1".

16. The UE of claim 9, wherein the SIP 380 response message is a response to a first SIP request message.

* * * * *